(12) United States Patent
Mo et al.

(10) Patent No.: US 12,399,135 B2
(45) Date of Patent: Aug. 26, 2025

(54) OPTICAL INSPECTION TOOL AND INSPECTION METHOD FOR INSPECTING MULTIFACETED GROOVE SPECIMENS

(71) Applicant: Intel Corporation, Santa Clara, CA (US)

(72) Inventors: Jianyong Mo, Chandler, AZ (US); Fan Fan, Chandler, AZ (US); Liang Zhang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 477 days.

(21) Appl. No.: 17/737,045

(22) Filed: May 5, 2022

(65) Prior Publication Data

US 2023/0358690 A1 Nov. 9, 2023

(51) Int. Cl.
*G01N 21/956* (2006.01)
*G01N 21/95* (2006.01)
*H04N 23/90* (2023.01)

(52) U.S. Cl.
CPC ....... *G01N 21/956* (2013.01); *G01N 21/9501* (2013.01); *H04N 23/90* (2023.01)

(58) Field of Classification Search
CPC ............. G01N 21/956; G01N 21/9501; G01N 21/9515; H04N 23/90
See application file for complete search history.

(56) References Cited

U.S. PATENT DOCUMENTS

| | | | | |
|---|---|---|---|---|
| 4,812,614 A * | 3/1989 | Wang | ................ | G05B 19/425 901/42 |
| 4,989,338 A * | 2/1991 | Tsuji | ................ | G01B 21/20 33/833 |
| 7,751,046 B2 * | 7/2010 | Levy | ................ | G01N 21/27 356/636 |
| 9,922,419 B2 * | 3/2018 | Takahashi | ................ | B65B 37/04 |
| 10,895,450 B2 * | 1/2021 | Lau | ................ | G06T 7/593 |
| 11,604,062 B2 * | 3/2023 | Haugen | ................ | G01B 11/25 |
| 2007/0023716 A1 * | 2/2007 | van der Burgt | ................ | G06T 7/001 250/559.29 |
| 2010/0208980 A1 * | 8/2010 | Urban | ................ | G01N 21/9501 382/149 |
| 2016/0104282 A1 * | 4/2016 | Takahashi | ................ | H04N 23/10 382/103 |
| 2019/0128666 A1 * | 5/2019 | Lau | ................ | G01B 11/2545 |
| 2020/0124407 A1 * | 4/2020 | Haugen | ................ | G06T 7/521 |
| 2020/0124410 A1 * | 4/2020 | Haugen | ................ | H04N 25/71 |

* cited by examiner

*Primary Examiner* — Roy M Punnoose
(74) *Attorney, Agent, or Firm* — Viering, Jentschura & Partner mbB

(57) ABSTRACT

An optical inspection tool may include at least a first image capture unit and a second image capture unit for inspecting specimens having a substantially V-shaped grooves. The first image capture unit may be arranged in a first orientation so as to be directable towards a first angular surface of the V-shaped groove of each specimen. The second image capture unit may be arranged in a second orientation so as to be directable towards a second angular surface of the V-shaped groove of each specimen. The first image capture unit may be configured to capture images of defects and/or contamination on the first angular surface and the second image capture unit may be configured to capture images of defects and/or contamination on the second angular surface.

20 Claims, 15 Drawing Sheets

OPTICAL INSPECTION TOOL AND INSPECTION METHOD FOR INSPECTING MULTIFACETED GROOVE SPECIMENS

TECHNICAL FIELD

Various aspects of the present disclosure generally relate an inspection tool and an inspection method for inspection of a multifaceted channel or groove of a specimen (e.g., workpiece, substrate etc.), and particularly to an inspection tool and an inspection method for inspection of slope-sided grooves or grooved-shaped features or substantially V-shaped grooves in photonics integrated chips (e.g., semiconductor substrates).

BACKGROUND

Butt optical coupling of laser beam(s), which may be generated from silicon photonics chips, coupled to optical fibers placed or fixed on precisely (in other words, high-precision) manufactured slope-sided grooves or V-shaped grooves is a popular approach in the industry (e.g., semiconductor industry). Such V-shaped grooves may be formed or manufactured using processes, such as thin film coating and anisotropic etching, for example, within CMOS semiconductor fabs. A slope of the sidewall(s) of such V-shaped grooves may be defined by the silicon crystal orientation (e.g., of a semiconductor substrate on which the groove(s) may be formed), while an opening/width of the V-shaped grooves may be controlled by a photolithographic mask size. Optical fibers can be guided passively by such V-shaped grooves to be aligned with waveguides/spot size converter (e.g., in photonic chip(s)). However, due to small or tight permissible alignment tolerance (e.g., ~2 μm), care needs to be taken during formation and/or handling of such V-shaped grooves. Foreign materials (e.g., contaminants) in such V-shaped grooves and/or imperfectly etched V-shaped grooves can displace the optical fibers which may, in turn, lead to misalignment between optical fibers and the corresponding waveguides (to which the optical fibers are intended to be aligned with), thereby resulting in low optical coupling efficiency.

Conventional inspection systems and inspection methods are inefficient or slow to conduct and are thus not suitable for high rate or high throughput inspection of V-shaped grooves on semiconductor substrates.

Accordingly, there is a need for an improved inspection tool and inspection method which solve at least the above issue.

BRIEF DESCRIPTION OF THE DRAWINGS

In the drawings, like reference characters generally refer to the same parts throughout the different views. The drawings are not necessarily to scale, emphasis instead generally being placed upon illustrating aspects of the disclosure. In the following description, various aspects are described with reference to the following drawings, in which.

DETAILED DESCRIPTION

Figure 1:
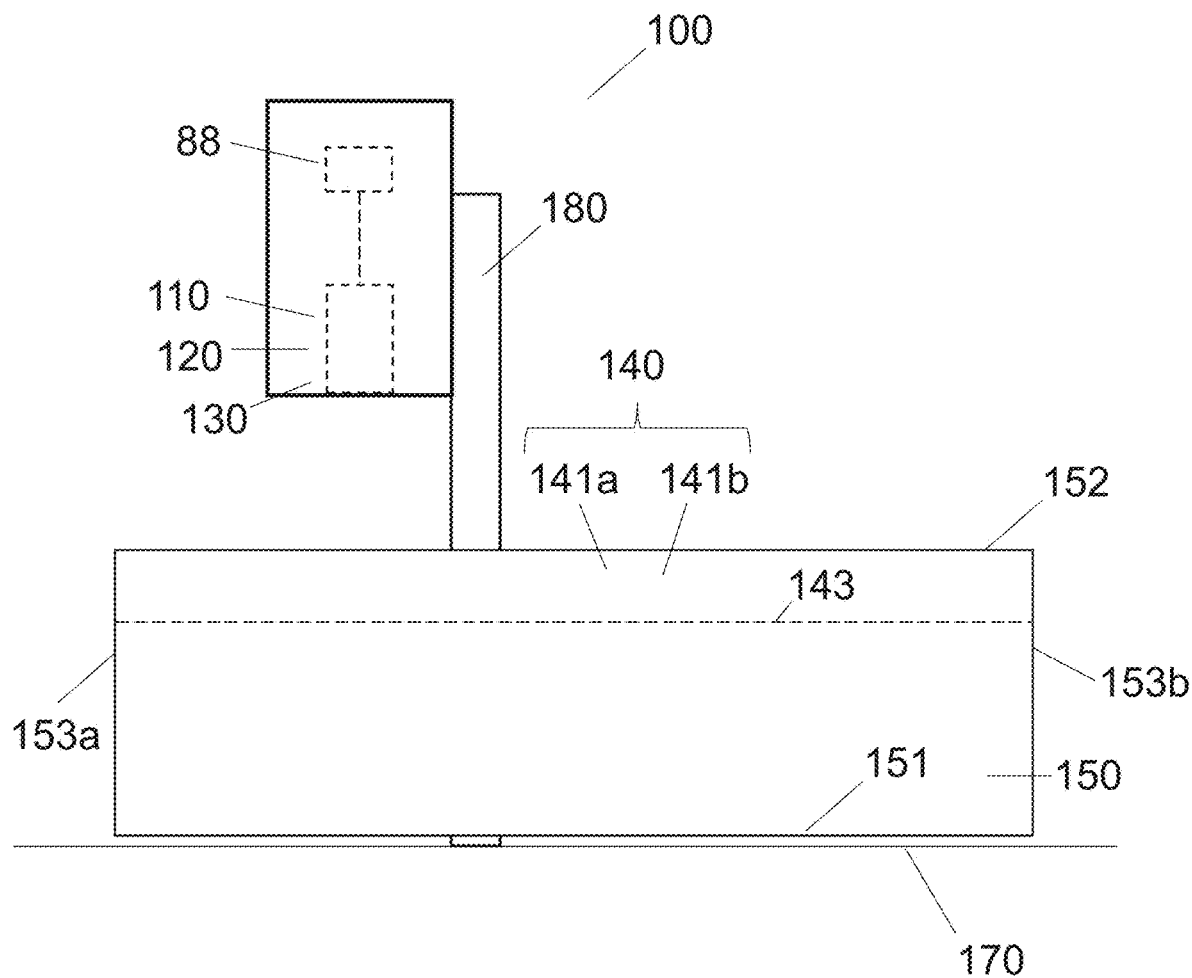
FIG. 1 shows a schematic side view of an inspection tool and a specimen for inspection using the inspection tool, according to various aspects of the present disclosure.

Aspects described below in context of the apparatus are analogously valid for the respective method, and vice versa. Furthermore, it will be understood that the aspects described below may be combined, for example, a part of one aspect may be combined with a part of another aspects.

It should be understood that the terms "on", "over", "top", "bottom", "down", "side", "back", "left", "right", "front", "lateral", "side", "up", "down", etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various aspects generally relate to a multi-vision (e.g., triple-vision) inspection tool or system that may be capable of simultaneously inspecting (i) at least two sidewalls (e.g., angular surfaces) of a V-groove or a substantially V-shaped groove of a specimen and/or (ii) bottom plateau (e.g., floor surface) of the V-groove or substantially V-shaped groove of the specimen and/or (iii) a top surface of the specimen. The inspection tool or system may be used for inspection and/or sorting, at a wafer level of a semiconductor process line, at a singulated die level of the semiconductor process line, and/or at a package level of the semiconductor process line.

In other words, a multi-vision (e.g., double-vision, triple-vision, quadruple-vision etc.) system or inspection tool, which may be capable of simultaneously inspecting or capturing images of a plurality or all surfaces of a V-groove or a substantially V-shaped groove of a specimen may be provided. In particular, three vision systems (e.g., three image capture units) of the multi-vision system or inspection tool may be oriented (e.g., to be perpendicular to each surface of a substantially V-shaped groove of a specimen under inspection) respectively or individually or independently. In addition, each image capture unit of the inspection tool may have very high optical resolution such that the inspection tool may be capable of detecting sub-micrometer foreign materials (e.g., along the substantially V-shaped groove of the specimen).

Accordingly, various aspects may provide an inspection tool (e.g., an optical inspection tool) as well as a specimen for inspection by the inspection tool. The specimen may include a multifaceted channel or groove (in other words, a channel or groove which may be defined by multiple surfaces, e.g., planar surfaces or inner surfaces of the specimen).

The inspection tool according to various aspects may include a plurality of image capture units (e.g., cameras, sensors, 2-dimensional cameras or sensors, 3-dimensional cameras or sensors, 3-dimensional profilers, triangulation sensors, chromatic confocal 3-dimensional profilers, or laser confocal 3-dimensional profilers, etc.) which may be equal to a number of angular surfaces of the channel or groove (e.g., angular or non-parallel with respect to the base surface of the specimen), or may include a number of image capture units equal (e.g., exactly equal) to a total number of facets or surfaces of the channel or groove. Each image capture unit of the inspection tool according to various aspects may be "optimized" to focus or be focused to only one surface (e.g., unique surface) of the multifaceted channel or groove. In another aspect, at least one image capture unit may be "optimized" to focus or be focused to more than one (e.g., two) surfaces (e.g., parallel surfaces).

Various aspects may also provide an inspection method involving the multi-vision (e.g., double-vision, triple-vision, quadruple-vision etc.) system or inspection tool to inspect a specimen. The inspection method according to various aspects may be non-destructive to the specimen under inspection and may not involve or require any contact (e.g., physical or direct contact) between the specimen and the inspection tool. The inspection method may also be performed swiftly. For instance, with the inspection method according to various aspects, all inner surfaces of a specimen defining or forming a V-groove or substantially V-shaped groove of the specimen may be inspected (e.g., have images thereof captured), simultaneously or instantaneously using the inspection tool. In an aspect, the inspection method may be completed within a fraction of second.

Additionally, the inspection method can be implemented at any one or more stage(s) of a process line (e.g., manufacturing line, semiconductor process line, etc.). Accordingly, within a semiconductor process line, the inspection method can be applied or easily conducted at a wafer level, die level, and/or package level of the process.

FIG. 1 shows a schematic side view of an inspection tool 100 and a specimen 150 for inspection using the inspection tool 100, according to various aspects of the present disclosure.

According to an aspect of the present disclosure, the specimen 150 may be, for example, a workpiece (e.g., metallic workpiece which may be or which may have already been worked on with a tool or a machine, or a metallic part of a ship or vehicle), a substrate (e.g., semiconductor substrate, silicon substrate etc.), a wafer, an electronic circuit board etc., or any other suitable type of specimen for inspection using the inspection tool 100.

For ease of illustration, various aspects of the disclosure may be described herein with reference to the specimen 150 being a semiconductor substrate. Nevertheless, it is understood that the inspection tool 100 as well as inspection method (described later with reference to FIG. 4), as disclosed herein, according to various aspects of the present disclosure, may be applicable to or may extended to other types of specimens, for example, a workpiece (e.g., small-sized metallic workpiece, or large-sized workpiece which may be part of a ship or vehicle).

As shown in FIG. 1, the specimen 150 may include a base surface 151 (e.g., base) and a top surface 152 opposite the base surface 151. The base surface 151 may be a bottom of the specimen 150 configured to abut or contact or rest on an external surface or platform 170 on which the specimen 150 may also be placed on for inspection by the inspection tool 100. The top surface 152 of the specimen 150 may be an upper surface of the specimen 150, opposite the base surface 151. According to an aspect of the present disclosure, the specimen 150 may further include at least one or a plurality of side surfaces 153*a* and/or 153*b* extending between the base surface 151 and the top surface 152. Accordingly, the specimen 150 may be shaped as a block or may have a block-like shape, or a non-block-like shape.

According to an aspect of the present disclosure, the specimen 150 may include a first channel 140 for receiving an object therein or therewithin. As shown, the first channel 140 may be positioned in the top surface 152. The first channel 140 may extend into the specimen 150 from the top surface 152 (e.g., downwards, or towards the base surface 151). Further, the first channel 140 may run along the top surface 152 of the specimen 150. Specifically, in an aspect, the first channel 140 may be extending (or running) along the top surface 152 of the specimen 150 in a first direction (e.g., a horizontal/lateral direction, e.g., with respect to the base surface 151 of the specimen 150 or the external surface 170 on which the specimen 150 may be placed), between a first longitudinal end (e.g., first side surface 153*a*) of the specimen 150 and a second longitudinal end opposite the first longitudinal end (e.g., second side surface 153*b* opposite the first side surface 153*a*) of the specimen 150.

According to an aspect of the present disclosure, the first channel 140 may be a groove. The first channel 140 (e.g., groove) may be a multifaceted groove defined or formed by two or more inner surfaces (e.g., planar or substantially planar inner surfaces) of the specimen 150.

According to an aspect of the present disclosure, the first channel 140 may be defined or formed by at least two (e.g., two or more than two) angular surfaces 141*a* and 141*b* of the specimen 150. Specifically, the at least two angular surfaces 141*a* and 141*b* may be angular inner surfaces of the specimen 150 (e.g., opposite outer surfaces, e.g., side surfaces 153*a* and 153*b* of the specimen 150). The at least two angular surfaces 141*a* and 141*b* may be non-parallel (in other words, may be inclined) with respect to the base surface 151 (e.g., a substantially planar or flat base surface 151) of the specimen 150. Specifically, the at least two angular surfaces 141*a* and 141*b* may be declining from the top surface 152. In other words, the at least two angular surfaces 141a and 141b may be non-horizontal surfaces and/or may be inclined surfaces with respect to the external surface 170 on which the specimen 150 may be placed. The at least two angular surfaces 141a and 141b may be disparate and/or different surfaces of the specimen 150 which define the first channel 140 of the specimen 150. Hence, the at least two angular surfaces 141a and 141b may be oriented (e.g., with respect to the base surface 151 of the specimen 150 and/or the external surface 170 on which the specimen 150 may be placed) in a different orientation from one another.

In an aspect, the at least two angular surfaces 141a and 141b of the specimen 150 defining the first channel 140 may be connected to or abutting each other, for instance, at a bottom or a trough of the first channel 140.

In another aspect, the first channel 140 may further be defined or formed by a floor surface 143 of the specimen 150. Specifically, the floor surface 143 may be an inner floor surface 143 of the specimen 150 defining the first channel 140, and/or may be a bottom surface of the first channel 140 (e.g., opposite the outer base surface 151 of the specimen 150). The floor surface 143 may be positioned or arranged between the at least two angular surfaces 141. For example, the at least two angular surfaces 141a and 141b may be adjoined to and may extend (e.g., upwardly, e.g., perpendicularly or non-perpendicularly) from the floor surface 143 of the specimen 150 (e.g., towards or to an opening of the channel at or on the top surface 152 of the specimen 150). In an aspect, the floor surface 143 may be parallel (e.g., substantially parallel) with the base surface 151 of the specimen 150. In another aspect, the floor surface 143 may be non-parallel with the base surface 151 of the specimen 150. Accordingly, according to an aspect of the present disclosure, the first channel 140 may include or may have a shape of a truncated (e.g., half of an) octagon (e.g., regular or irregular octagon), a truncated nonagon (e.g., regular or irregular octagon), a truncated decagon (e.g., regular or irregular octagon) etc.

According to an aspect of the present disclosure, the first channel 140 may be formed by an etching process applied on or to the top surface 152 of the specimen 150. Hence, when the specimen 150 is a semiconductor substrate or a silicon substrate, an etching process may be applied on or to the top surface 152 of the semiconductor substrate or silicon substrate to form the first channel 140.

Specifically, according to an aspect of the present disclosure, the first channel 140 may (e.g., through an etching process) be formed as a substantially V-shaped groove or V-like groove (herein collectively or interchangeably referred to as "V-groove") on the specimen 150 (e.g., semiconductor substrate). Such a V-groove (e.g., on a semiconductor substrate or a silicon substrate) may guide and support an optical fiber (i.e. the object) and may serve to align an optical fiber core of the optical fiber (i.e. the object) to a corresponding waveguide (e.g., in a silicon photonic chip (PICs)).

According to an aspect of the present disclosure, a first angular surface 141a of the at least two angular surfaces 141a and 141b of the specimen 150 defining the first channel 140 (e.g., V-groove) may be opposing (e.g., substantially opposing) a second angular surface 141b of the at least two angular surfaces 141a and 141b of the specimen 150 defining the first channel 140. Further, each of the first angular surface 141a and the second angular surface 141b of the first channel 140 (e.g., V-groove) may form an angle (e.g., opposing angle) of between substantially 50 degrees to substantially 60 degrees with respect to the base surface 151 of the specimen 150 and/or with respect to the external surface 170 (e.g., when the specimen 150 is placed thereon). Specifically, each of the first angular surface 141a and the second angular surface 141b of the first channel 140 (e.g., V-groove) may form an angle (e.g., opposing angle) of approximately or substantially 54 to substantially 55 degrees (e.g., 54.74 degrees) with respect to the base surface 151 of the specimen 150 and/or with respect to the external surface 170 (e.g., when the specimen 150 is placed thereon). Thus, for example when the first angular surface 141a and the second angular surface 141b of the first channel 140 are substantially symmetrical about a central axis or plane of the first channel 140, the first angular surface 141a and the second angular surface 141b of the first channel 140 may form an angle (e.g., opposing angle) of between substantially 60 degrees to substantially 80 degrees with respect to one another, or more specifically, between substantially 70 degrees to substantially 72 degrees (e.g., 70.52 degrees) with respect to one another.

According to an aspect of the present disclosure, an opening on the top surface 152 of the specimen 150 for providing access to the first channel 140 (i.e. the opening of the first channel 140 e.g., V-groove) may have a width (e.g., measured laterally) within a range of approximately 100 μm to 200 μm (e.g., 160 μm). In another aspect, the first channel may have a shortest width of not more than or less than 200 μm. Nevertheless, the width of the opening of the first channel 140 is not limited as such. For example, according to various other aspects, the width of the opening of the first channel 140 may be larger than 200 μm.

According to an aspect of the present disclosure, the specimen 150 may further include at least one (e.g., one or more) secondary channel(s) (e.g., further channel(s)) (not shown in FIG. 1; described in detail later with reference to FIG. 3). Each secondary channel may be similar or identical to the first channel 140. That is, each secondary channel may have a similar or an identical dimension, size, shape, form etc., as the first channel. Accordingly, each secondary channel may be positioned in and may extend along the top surface 152 of the specimen 150, in a same (e.g., identical or similar) direction (i.e. the first direction) as the first channel 140. Further, the secondary channel may be positioned adjacent or besides or in a side-by-side arrangement with the first channel 140.

With reference to FIG. 1, the inspection tool 100 may include (e.g., further include) a support frame 180 configured to or for securing or affixing or supporting the inspection tool 100 to or on the external surface 170. According to an aspect of the present disclosure, the inspection tool 100 may (e.g., optionally) include a support platform for supporting the specimen 150 thereon. According to an aspect of the present disclosure, the support platform may be included in or may be the external surface 170.

According to an aspect of the present disclosure, the inspection tool 100 may be an optical inspection tool 100. The inspection tool 100 (e.g., optical inspection tool 100) may include at least a first image capture unit 110 and a second image capture unit 120 respectively configured to or may be for inspecting the specimen 150 (e.g., a V-groove of the specimen 150).

According to an aspect of the present disclosure, the inspection tool 100 (e.g., optical inspection tool 100) may include (e.g., further include) a third image capture unit 130 configured to or for inspecting the specimen 150 (e.g., V-groove of the specimen 150).

In an aspect, each or all image capture unit(s) 110 and/or 120 and/or 130 of the inspection tool 100 may be or may include a camera, sensor, 2-dimensional camera or sensor, 3-dimensional camera or sensor, 3-dimensional profiler, triangulation sensor, chromatic confocal 3-dimensional profiler, or laser confocal 3-dimensional profiler, etc.

The first image capture unit 110 may be arranged in a first orientation (e.g., with respect to the base surface 151 of the specimen 150 and/or with respect to the support frame 180 of the inspection tool 100) and/or may be directable so as to face or be directed towards the first angular surface 141*a* of the first channel 140 or a first secondary angular surface of the secondary channel (e.g., V-groove(s)) (not shown in FIG. 1) of the specimen 150. In other words, the first image capture unit 110 when arranged in the first orientation may be directable towards the first angular surface 141*a* of the first channel 140 or the first secondary angular surface of the secondary channel (not shown in FIG. 1). In particular, according to an aspect of the present disclosure, the first image capture unit 110 may be arranged in the first orientation with respect to the support frame 180 of the inspection tool 100, such that when the inspection tool 100 is secured to the external surface 170 and the specimen 150 is placed on the external surface 170, the first image capture unit 110 may be directed towards the first angular surface 141*a* of the first channel 140 or the first secondary angular surface of the secondary channel (not shown in FIG. 1). Accordingly, the first image capture unit 110 may be configured to capture image(s) of (e.g., of defects and/or contamination on) the first angular surface 141*a* or first secondary angular surface (not shown in FIG. 1).

The second image capture unit 120 may be arranged in a second orientation (e.g., with respect to the base surface 151 of the specimen 150 and/or with respect to the support frame 180 of the inspection tool 100) and/or may be directable so as to face or be directed towards the second angular surface 141*b* of the first channel 140 or a second secondary angular surface of the secondary channel (e.g., V-groove(s)) (not shown in FIG. 1) of the specimen 150. Hence, the second orientation may differ from the first orientation (e.g., with respect to the base surface 151 of the specimen 150 and/or with respect to the support frame 180 of the inspection tool 100). In particular, according to an aspect of the present disclosure, the second image capture unit 120 may be arranged in the second orientation with respect to the support frame 180 of the inspection tool 100, such that when the inspection tool 100 is secured to the external surface 170 and the specimen 150 is placed on the external surface 170, the second image capture unit 120 may be directed towards the second angular surface 141*b* of the first channel 140 or the second secondary angular surface of the secondary channel. Accordingly, the second image capture unit 120 may be configured to capture image(s) of (e.g., of defects and/or contamination on) the second angular surface 141*b* or second secondary angular surface.

The third image capture unit 130 may be arranged in a third orientation (e.g., with respect to the base surface 151 of the specimen 150 and/or with respect to the support frame 180 of the inspection tool 100) and/or may be directable so as to face or be directed towards the floor surface 143 of the first channel 140 or a secondary floor surface of the secondary channel (e.g., V-groove(s)) (not shown in FIG. 1). Hence, the third orientation may differ from the first orientation and the second orientation. In particular, according to an aspect of the present disclosure, the third image capture unit 130 may be arranged in the third orientation with respect to the support frame 180 of the inspection tool 100, such that when the inspection tool 100 is secured to the external surface 170 and the specimen 150 is placed on the external surface 170, the third image capture unit 130 may be directed towards the floor surface 143 of the first channel 140 or the secondary floor surface of the secondary channel. Accordingly, the third image capture unit 130 may be configured to capture image(s) of (e.g., of defects and/or contamination on) the floor surface 143 or secondary floor surface.

The inspection tool 100 may (e.g., optionally) include (e.g., further include) a processor 88. The processor 88 may be coupled to at least the first image capture unit 110 and the second image capture unit 120 and may optionally be further coupled to the third image capture unit 130. Hence, the processor may be configured to analyse the captured images by the first image capture unit 110 and the second image capture unit 120 and by the third image capture unit 130 (e.g., when the processor is also coupled to the third image capture unit 130).

Any defects and/or contamination along the first channel 140 or secondary channel (not shown in FIG. 1) may be identified, for example, by comparing the captured image(s) (e.g., by the first image capture unit 110, second image capture unit 120, third image capture unit 130 etc.) against ideal image(s) (e.g., of an ideal angular surface, ideal secondary angular surface, ideal floor surface, ideal secondary floor surface etc., which, for example, may be stored in a memory of the processor 88 or fed to the processor 88 or provided to a human operator) to identify "differences" (e.g., using the processor 88, or manually using sight of the human operator) between the captured image(s) (e.g., by the first image capture unit 110, second image capture unit 120, third image capture unit 130 etc.) and the ideal image(s) as potential defects and/or contamination. For example, defects such as lateral translation misalignment (or lateral misalignment) may be identified by comparing a captured image of a respective surface defining the first channel 140 or secondary channel against an ideal image of the corresponding surface, and any lateral deviation of the captured image from the ideal image may be identified as a lateral translation misalignment. On the other hand, contamination (e.g., contaminants or external particles) may be identified as a dark (or darker) spot or dot (see ref 50 in FIG. 7C) within a captured image of the respective surface defining the first channel 140 or secondary channel.

According to an aspect of the present disclosure, each of the first image capture unit 110 and/or the second image capture unit 120 and/or the third image capture unit 130 may be "optimized", that is, may be configured to be "focused" on or to (e.g., to only) a surface defining the first channel 140 or the secondary channel that the said image capture unit is directed towards or is facing such that the said image capture unit is capable or is configured to capture a focused or sharp (e.g., substantially sharp) image of (e.g., of only) the said surface.

According to an aspect of the present disclosure, one or more or all of the first image capture unit 110 and/or the second image capture unit 120 and/or the third image capture unit 130 may have a numerical aperture of 0.95 (e.g., substantially 0.95), or a numerical aperture of less than 0.95. For example, each of the first image capture unit 110 and the second image capture unit 120 may have a numerical aperture of less than 0.95, while the third image capture unit 130 may have a numerical aperture of 0.95 (in other words, the numerical aperture of the third image capture unit 130 may be larger/higher in value than the numerical apertures of the first image capture unit 110 and the second image capture unit 120). As another example, all of the first image capture unit 110, the second image capture unit 120, and the third image capture unit 130 may have a same (e.g., identical or similar) numerical aperture (e.g., either 0.95 or of a value less than 0.95).

According to an aspect of the present disclosure, any one or more or all of the first image capture unit 110, the second image capture unit 120, and/or the third image capture unit 130 may be configured with a pixel resolution of substantially 500 nm.

Further, any one or more or all of the first image capture unit 110, the second image capture unit 120, and/or the third image capture unit 130 may be configured with a field of view of substantially 3.5 mm by 5 mm Further, any one or more or all of the first image capture unit 110, the second image capture unit 120, and/or the third image capture unit 130 may be configured with a depth of field of substantially 30 µm.

According to an aspect of the present disclosure, all image capture units (e.g., the first image capture unit 110, the second image capture unit 120, the third image capture unit 130 etc.) of the inspection tool 100 may be identical to each other. That is, according to an aspect of the present disclosure, all image capture units (e.g., the first image capture unit 110, the second image capture unit 120, the third image capture unit 130 etc.) of the inspection tool 100 may have a same "image capture" setting and/or configuration and/or may be of a same type of image capture unit (e.g., microscope, digital camera, camera, sensor, 2-dimensional camera or sensor, 3-dimensional camera or sensor, 3-dimensional profiler, triangulation sensor, chromatic confocal 3-dimensional profiler, or laser confocal 3-dimensional profiler etc.).

According to an aspect of the present disclosure, the inspection tool 100 may be part of an inspection system (not shown). In other words, an inspection system (not shown) may include the inspection tool 100 as described herein. The inspection system may further include a first station (e.g., corresponding to a wafer level of a semiconductor process line). The inspection system may further include a second station (e.g., corresponding to a die level of the semiconductor process line). The inspection system may further include a third station (e.g., corresponding to a package level of the semiconductor process line). The second station may be downstream of the first station, and the third station may be downstream of the second station. Each station may include at least one inspection tool 100 (e.g., secured to a corresponding external surface or platform 170 at the station for placing the specimen 150 thereon). Hence, when the inspection system includes three stations, the inspection system may include three inspection tools 100 (i.e. one inspection tool 100 for each station).

In an aspect, the inspection system may include (e.g., further include) the specimen 150.

In an aspect, the inspection system may include (e.g., further include) a conveyor (not shown) configured to or for moving the specimen 150 between stations (e.g., from the first station to the second station and/or from the second station to the third station), such that at each station, the conveyor positions the specimen 150 (e.g., on a corresponding external surface or platform 170 disposed at that station) in a manner such that each image capture unit of the inspection tool 100 at that station is directed to face a distinct and/or only one inner surface (e.g., angular surface or floor surface) of a channel (e.g., first channel 140 or secondary channel) of the specimen 150. Further, at each station, the conveyor may also be configured to move the specimen 150 (e.g., with respect to the station), in a manner (e.g., lateral or sideway manner, relative to direction of the conveyor from one station to another station) such that the inspection tool 100 at that station may be capable of capturing image(s) of any secondary channel(s) of the specimen 150 after capturing image(s) of the first channel 140, for example, without having to move the inspection tool 100 itself.

According to an aspect of the present disclosure, the inspection system (as described) may be positioned or disposed within in an atmospherically-controlled chamber or room, and further, the specimen 150 (or a plurality of specimens 150) may be conveyed (e.g., by the conveyor) to the inspection system for inspection by the inspection tool 100 of the inspection system within the atmospherically-controlled chamber or room.

Figure 2A:
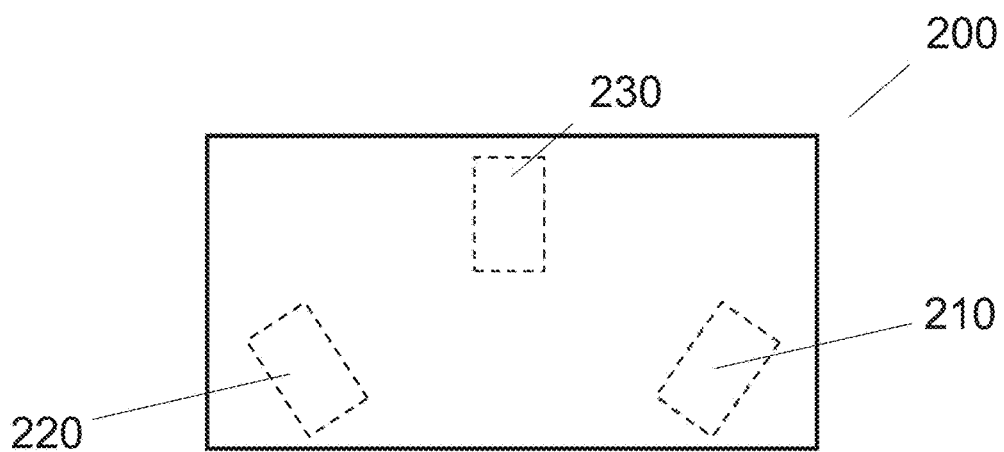
FIG. 2A shows a schematic front view of an inspection tool and a specimen which includes a substantially V-shaped groove, according to various aspects of the present disclosure.
Figure 2A:
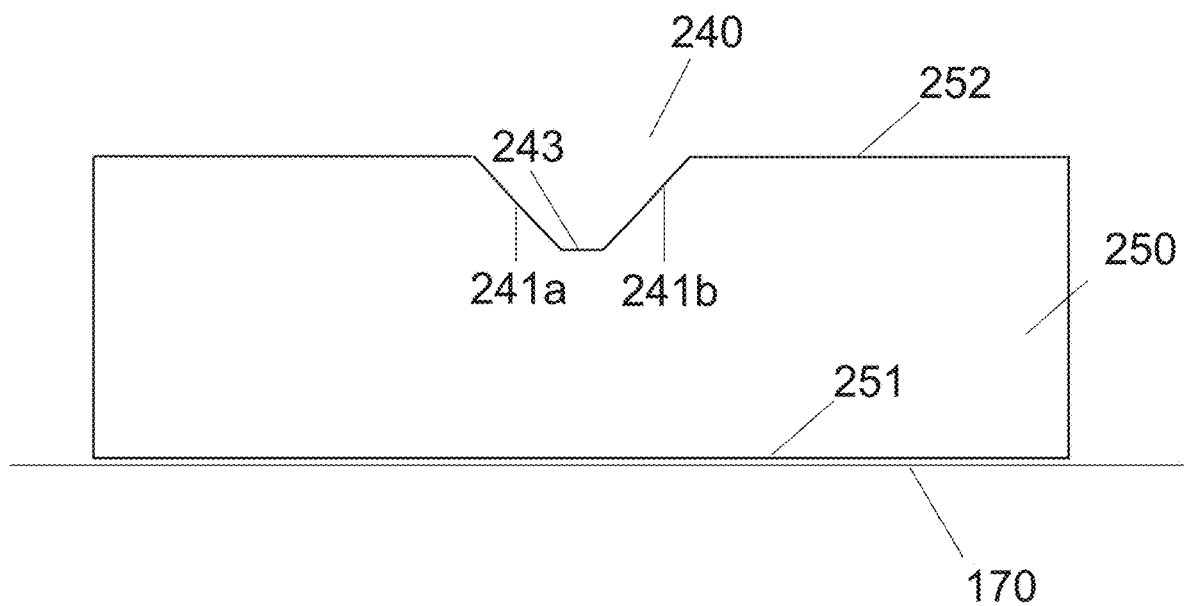

FIG. 2A shows a schematic front view of an inspection tool 200 and a specimen 250 which includes a substantially V-shaped groove 240, according to various aspects of the present disclosure.

According to an aspect of the present disclosure, the inspection tool 200 of FIG. 2A may contain any one or more or all the features and/or limitations of the inspection tool 100 of FIG. 1. In the following, the inspection tool 200 is described with like reference characters generally referring to the same or corresponding parts/features of the inspection tool 100 of FIG. 1. The description of the parts/features made with respect to inspection tool 200 may also be applicable with respect to inspection tool 100, and vice versa.

Further, according to an aspect of the present disclosure, the specimen 250 of FIG. 2A may contain any one or more or all the features and/or limitations of the specimen 150 of FIG. 1. In the following, the specimen 250 is described with like reference characters generally referring to the same or corresponding parts/features of the specimen 150 of FIG. 1. The description of the parts/features made with respect to specimen 250 may also be applicable with respect to specimen 150, and vice versa.

As in the inspection tool 100 of FIG. 1, the inspection tool 200 of FIG. 2A may include a first image capture unit 210, a second image capture unit 220, and a third image capture unit 230.

As in the specimen 150 of FIG. 1, the specimen 250 of FIG. 2A may include a first channel 240. As shown, the first channel 240 may be a substantially V-shaped groove defined or formed by a floor surface (i.e. inner floor surface) 243 as well as a first angular surface (i.e. angular inner surface) 241*a* and a second angular surface 241*b* extending from the floor surface 243 towards or to an opening of the first channel 240 at a top surface 252 of the specimen 250.

The first channel 240 of the specimen 250 may be dimensioned to and/or may be sized to receive or fit an optical fiber (e.g., an object) therein or therewithin and/or at least partially grip or sandwich or hold the optical fiber. Accordingly, each of the first angular surface 241*a* and the second angular surface 241*b* of the first channel 240 of the specimen 250 may form an angle (e.g., opposing angle) of between substantially 50 degrees to substantially 60 degrees with respect to a base surface 251 of the specimen 250. Specifically, each of the first angular surface 241*a* and the second angular surface 241*b* of the first channel 240 may form an angle (e.g., opposing angle) of approximately or substantially 54 to substantially 55 degrees (e.g., 54.74 degrees) with respect to the base surface 251 of the specimen 250. Hence, according to an aspect of the present disclosure, for example when the first angular surface 241*a* and the second angular surface 241*b* are substantially symmetrical about a central axis or plane of the first channel 240, the first angular surface 241*a* and the second angular surface 241*b* of the first channel 240 may form an angle (e.g., opposing angle) of between substantially 60 degrees to substantially 80 degrees with respect to one another, or more specifically, between substantially 70 degrees to substantially 72 degrees with respect to one another (e.g., 70.52 degrees) with respect to one another, for receiving (e.g., at least partially receiving and/or holding) the optical fiber therebetween. According to an aspect of the present disclosure, the opening on the top surface 252 of the specimen 250 for providing access to the first channel 240 may have a width (e.g., measured laterally) or a shortest width equal (e.g., substantially equal) to or larger than a largest width of the optical fiber.

Figure 2B:
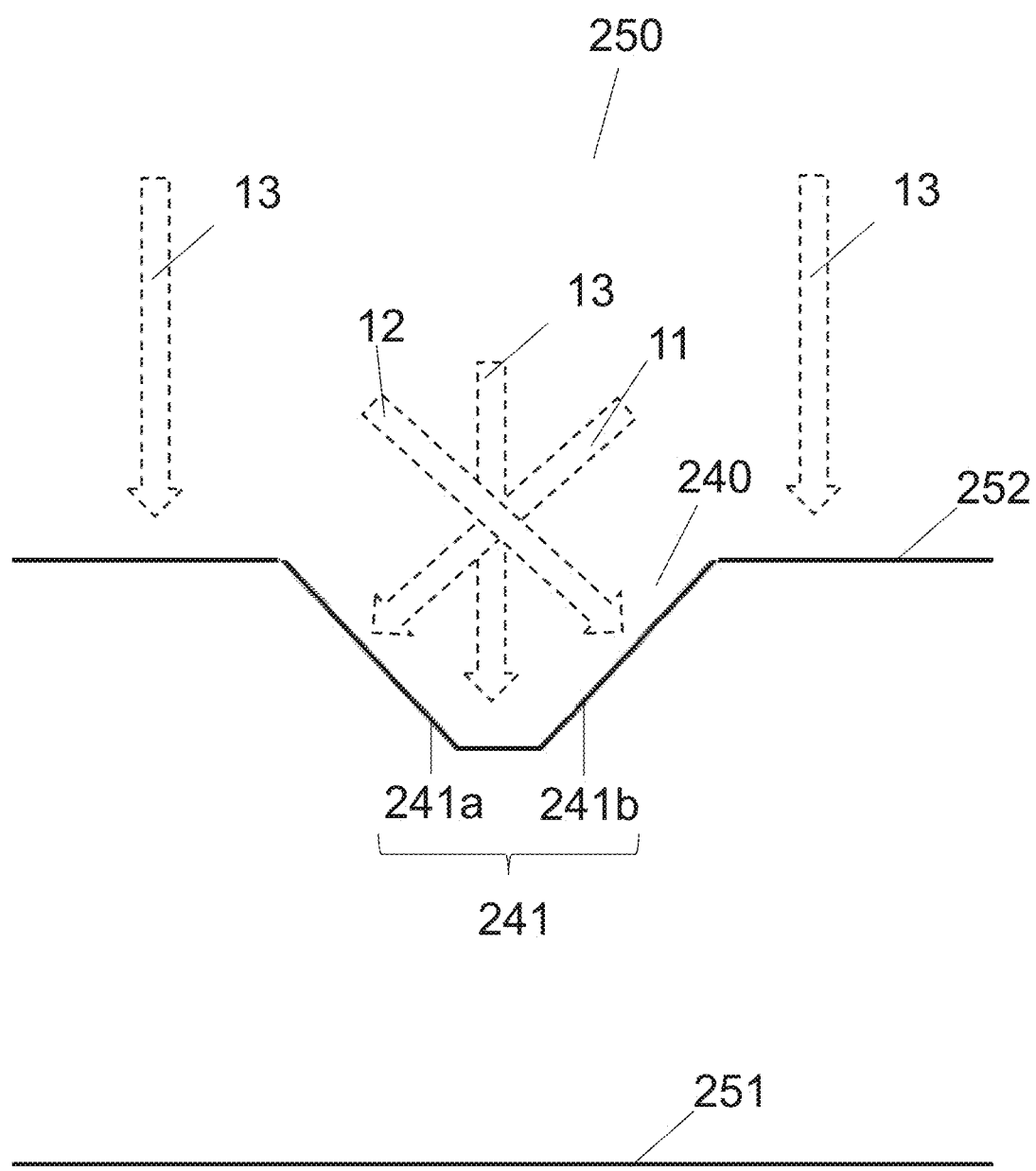
FIG. 2B shows a close-up schematic front view of surfaces of the specimen of FIG. 2A which define the substantially V-shaped groove with respect to corresponding orientations or directions of image capture units of the inspection tool of FIG. 2A, according to various aspects of the present disclosure.

FIG. 2B shows a close-up schematic front view of surfaces of the specimen 250 of FIG. 2A which define the substantially V-shaped groove 240 with respect to corresponding orientations or directions of the image capture units 210, 220 and 230 of the inspection tool 250 of FIG. 2A, according to various aspects of the present disclosure.

With reference to FIG. 2A and FIG. 2B, the first image capture unit 210 may be configured in a first orientation or direction (as shown by arrow 11) to face or be directed to the first angular surface 241a of the first channel 240. In particular, an optical axis of the first image capture unit 210 (e.g., optical axis of a lens, camera, sensor etc. of the first image capture unit 210) may be perpendicular (e.g., substantially perpendicular) to the first angular surface 241a. The first image capture unit 210 may be configured to be focused to (e.g., to only) the first angular surface 241a so as to capture an image (e.g., sharp image) of (e.g., only of) the first angular surface 241a.

The second image capture unit 220 may be configured in a second orientation or direction (as shown by arrow 12), which may be different from the first orientation, to face or be directed to the second angular surface 241b of the first channel 240. In particular, an optical axis of the second image capture unit 220 (e.g., optical axis of a lens, camera, sensor etc. of the second image capture unit 220) may be perpendicular (e.g., substantially perpendicular) to the second angular surface 241b. The second image capture unit 220 may be configured to be focused to (e.g., to only) the second angular surface 241b so as to capture an image (e.g., sharp image) of (e.g., only of) the second angular surface 241b.

The third image capture unit 230 may be configured in a third orientation or direction (as shown by arrow 13), which may be different from the first orientation and the second orientation, to face or be directed to the floor surface 243 of the first channel 240. In particular, an optical axis of the third image capture unit 230 (e.g., optical axis of a lens, camera, sensor etc. of the third image capture unit 230) may be perpendicular (e.g., substantially perpendicular) to the floor surface 243. In an aspect, the third image capture unit 230 may be configured to be focused to (e.g., to only) the floor surface 243 so as to capture an image (e.g., sharp image) of (e.g., only of) the floor surface 243. In another aspect, the floor surface 243 may be parallel (e.g., substantially parallel) with the top surface 252 of the specimen 250, and the third image capture unit 230 may be configured to be focused (e.g., substantially focused) to both the floor surface 243 and the top surface 252 of the specimen 250 (e.g., simultaneously, or alternatively, in sequence) so as to be capable of capturing an image (e.g., a substantially sharp or focused image) of both the floor surface 243 and the top surface 252 of the specimen 250.

Figure 3:
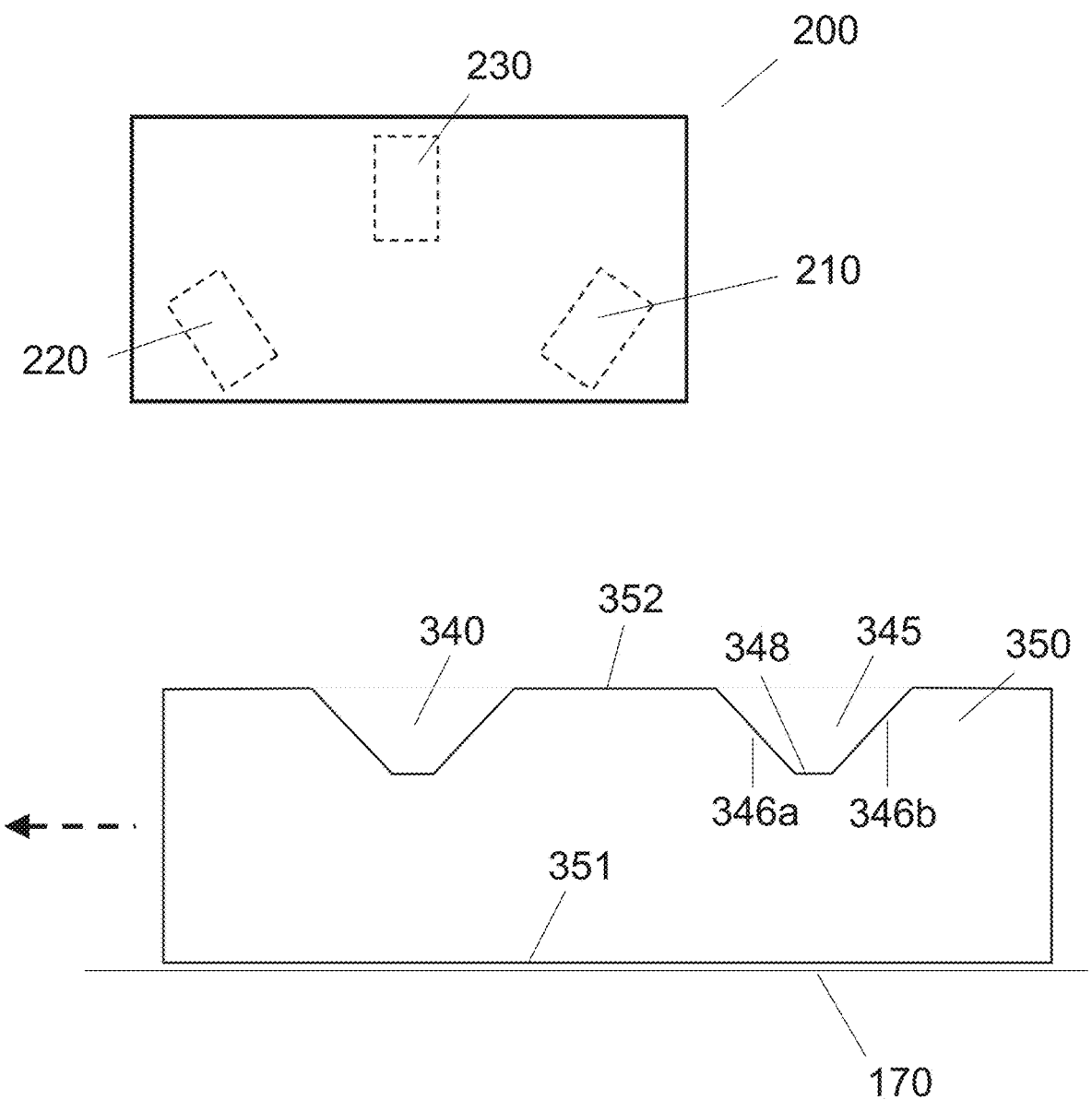
FIG. 3 shows a schematic front view of the inspection tool FIG. 2A and a specimen which includes a secondary substantially V-shaped groove for inspection by the inspection tool, according to various aspects of the present disclosure.

FIG. 3 shows a schematic front view of the inspection tool 200 of FIG. 2A and a specimen 350 which includes a secondary channel 345 for inspection by the inspection tool 200, according to various aspects of the present disclosure.

As shown, the specimen 350 may include a first channel 340. The first channel 340 of the specimen 350 may be similar or identical to the first channel 140 of the specimen 150 of FIG. 1 or the first channel 240 of the specimen 250 of FIG. 2A.

As shown, according to an aspect of the present disclosure, the specimen 350 may further include at least one (e.g., one or more) secondary channel(s) 345 (e.g., further channel(s)). Each secondary channel 345 may be similar or identical to the first channel 340. That is, each secondary channel 345 may have a similar or an identical dimension, size, shape, form etc., as the first channel 340.

Accordingly, the secondary channel 345 may be positioned in and may extend along a top surface 352 of the specimen 350, in a same (e.g., identical or similar) direction (i.e. the first direction) as the first channel 340. Further, the secondary channel 345 may be positioned adjacent or besides the first channel 340. In other words, the first channel 340 as well as the secondary channel 345 (e.g., at least one or more or all secondary channel(s) 345) may be in a side-by-side arrangement with respect to one another, on or along the top surface 352 of the specimen 350. The secondary channel 345 may be defined or formed by at least two secondary (e.g., at least two other) angular surfaces (i.e. angular inner surfaces) 346a and 346b of the specimen 350. As shown, the at least two secondary angular surfaces 346a and 346b defining the secondary channel 345 may be non-parallel (i.e. inclined) with a base surface 351 of the specimen 350. Further, the at least two secondary angular surfaces 346a and 346b may be oriented with respect to the base surface 351 of the specimen 350 in a different orientation from one another.

In an aspect, the secondary channel 345 may further be defined or formed by a secondary floor surface 348 of the specimen 350. The secondary floor surface 348 may be positioned or arranged between the at least two secondary angular surfaces 346a and 346b defining the secondary channel 345. For example, the at least two secondary angular surfaces 346a and 346b may be adjoined to and may extend (e.g., upwardly, e.g., perpendicularly or non-perpendicularly) from the secondary floor surface 348 of the specimen 350 defining the secondary channel 345 (e.g., towards or to an opening of the channel at or on the top surface 352). In an aspect, the secondary floor surface 348 may be parallel (e.g., substantially parallel) with the base surface 351 (e.g., substantially planar or flat base surface 351) of the specimen 350. In another aspect, the secondary floor surface 348 may be non-parallel with the base surface 351 of the specimen 350. Accordingly, according to an aspect of the present disclosure, the secondary channel 345 may include or may have a shape of a truncated octagon (e.g., regular or irregular octagon), a truncated nonagon (e.g., regular or irregular octagon), a truncated decagon (e.g., regular or irregular octagon) etc.

In another aspect (not shown), the at least two secondary angular surfaces 346a and 346b defining the secondary channel 345 may be connected to or abutting each other, for instance, at a bottom or a trough of the secondary channel 345.

According to an aspect of the present disclosure, the secondary channel 345 may be formed by an etching process applied on or to the top surface 352 of the specimen 350 (e.g., a semiconductor substrate or a silicon substrate).

Specifically, according to an aspect of the present disclosure, the secondary channel 345 may (e.g., through an etching process) be formed as a substantially V-shaped groove or V-like groove (i.e. "V-groove") on the specimen 350 (e.g., semiconductor substrate or silicon substrate).

Accordingly, a first secondary angular surface 346a of the specimen 350 defining the secondary channel 345 (e.g., V-groove) may be opposing (e.g., substantially opposing) a second secondary angular surface 346b of the specimen 350 defining the secondary channel 345. Further, each of the first secondary angular surface 346a and the second secondary angular surface 346b defining the secondary channel 345 (e.g., V-groove) may form an angle (e.g., opposing angle) of between substantially 50 degrees to substantially 60 degrees with respect to the base surface 351 of the specimen 350 and/or with respect to the external surface 170 (e.g., when the specimen 350 is placed thereon). Specifically, each of the first secondary angular surface 346a and the second secondary angular surface 346b defining the secondary channel 345 (e.g., V-groove) may form an angle (e.g., opposing angle) of approximately or substantially 54 to substantially 55 degrees (e.g., 54.74 degrees) with respect to the base surface 351 of the specimen 350 and/or with respect to the external surface 170 (e.g., when the specimen 350 is placed thereon). Thus, for example when the first secondary angular surface 346a and the second secondary angular surface 346b are substantially symmetrical about a central axis or plane of the secondary channel 345, the first secondary angular surface 346a and the second secondary angular surface 346b defining the secondary channel 345 may form an angle (e.g., opposing angle) of between substantially 60 degrees to substantially 80 degrees with respect to one another, or more specifically, between substantially 70 degrees to substantially 72 degrees (e.g., 70.52 degrees) with respect to one another.

To inspect the first channel 340 (e.g., a longitudinal segment of or the entire first channel 340) using the inspection tool 200, the specimen 350 may be moved in the first direction (e.g., in a same direction in which the first channel 340 is extending along), with respect the inspection tool 200, or vice versa (in other words, the inspection tool 200 may be moved relative to the specimen 350), while the image capture units 210, 220 and 230 of the inspection tool 200 are facing or directed towards the first channel 340.

To inspect the secondary channel 345, for example, after inspecting the first channel 340, the specimen 350 may be moved (e.g., in a second direction substantially perpendicular to the first direction), relative to the inspection tool 200, or vice versa (in other words, the inspection tool 200 may be moved relative to the specimen 350), such that (i) the first image capture unit 210 of the inspection tool 200 may face or be directed towards the first secondary angular surface 346a of the secondary channel 345, (ii) the second image capture unit 220 of the inspection tool 200 may face or be directed towards the second secondary angular surface 346b of the secondary channel 345, and/or (iii) the third image capture unit 230 of the inspection tool 200 may face or be directed towards the secondary floor surface 348 of the secondary channel 345.

Figure 4:
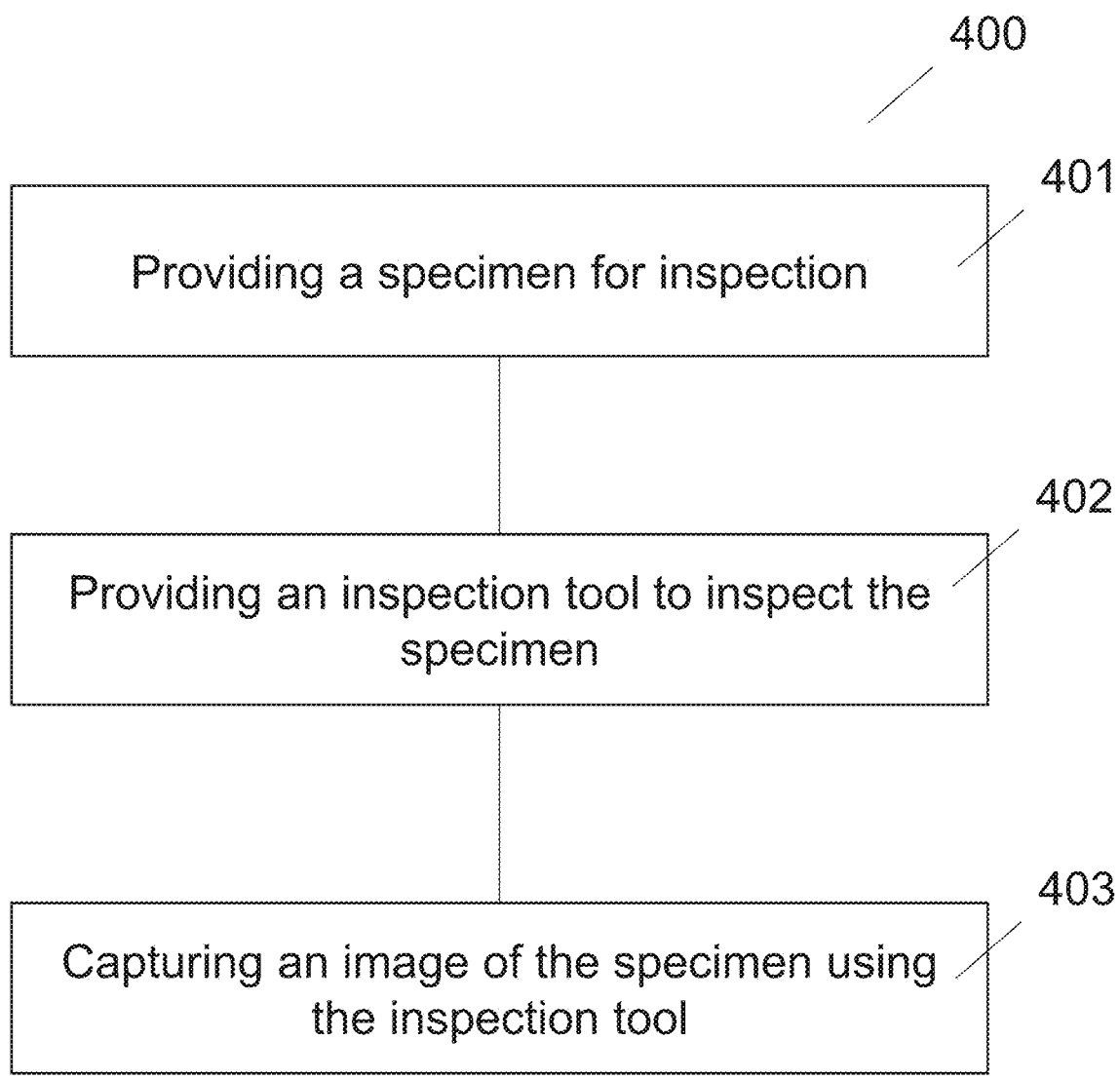
FIG. 4 depicts an inspection method, according to various aspects of the present disclosure.

FIG. 4 depicts an inspection method 400, according to various aspects of the present disclosure.

With reference to FIG. 1, FIG. 2A, FIG. 2B and FIG. 3, the inspection method 400, which may include or involve the inspection tool 100 or 200 and/or the specimen 150, 250 or 350, may be described.

According to an aspect of the present disclosure, the method 400 may include a step 401 of providing the specimen 150, 250 or 350 (e.g., semiconductor substrate) for inspection. The specimen 150, 250 or 350 may include the base surface 151 or 251, the top surface 152 or 252 opposite the base surface 151 or 251, and the first channel 140, 240 or 340 positioned in the top surface 152 or 252 in the first direction for receiving an object therein. The first channel 140, 240 or 340 may be formed by at least two angular surfaces 141a and 141b or 241a and 241b of the specimen 150, 250 or 350. The at least two angular surfaces 141a and 141b or 241a and 241b may be inclined with the base surface 151 or 251 of the specimen 150, 250 or 350. Further, at least two angular surfaces 141a and 141b or 241a and 241b may be oriented with respect to the base surface 151 or 251 in a different orientation from one another.

According to an aspect of the present disclosure, the method 400 may include (e.g., further include) a step 402 providing the inspection tool 100 or 200 to inspect the specimen 150, 250 or 350. The inspection tool 100 or 200 may include (i) the first image capture unit 110 or 210 oriented or configured to face a first angular surface 141a or 241a of the at least two angular surfaces 141a and 141b or 241a and 241b and (ii) the second image capture unit 120 or 220 oriented or configured to face a second angular surface 141b or 241b of the at least two angular surfaces 141a and 141b or 241. The inspection tool 100 or 200 may further include the support platform (e.g., which may be included in or may be the external surface 170).

According to an aspect of the present disclosure, the method 400 may include (e.g., further include) placing the specimen 150, 250 or 350 on the support platform (e.g., which may be included in or may be the external surface 170).

According to an aspect of the present disclosure, the method 400 may include (e.g., further include) a step 403 capturing an image (e.g., a first image) of the first angular surface 141a or 241a using the first image capture unit 110 or 210 and capturing an image (e.g., a second image) of the second angular surface 141b or 241b using the second image capture unit 120 or 220 (e.g., after placing the specimen 150, 250 or 350 on the support platform), for inspection of the specimen 150, 250 or 350.

According to an aspect of the present disclosure, in the method 400, the optical axis of the first image capture unit 110 or 210 may be substantially perpendicular to the first angular surface 141a or 241a. Further, the optical axis of the second image capture unit 120 or 220 may be substantially perpendicular to the second angular surface 141b or 241b.

According to an aspect of the present disclosure, in the method 400, the first channel 140, 240 or 340 may further include the floor surface 143 or 243 143 or 243 that may be substantially parallel with the base surface 151 or 251 of the specimen 150, 250 or 350. The floor surface 143 or 243 143 or 243 may be adjoined to and may be positioned between the first angular surface 141a or 241a and the second angular surface 141b or 241b.

According to an aspect of the present disclosure, in the method 400, the inspection tool 100 or 200 may further include the third image capture unit 130 or 230 which may be oriented or configured to face the floor surface 143 or 243 143 or 243. According to an aspect of the present disclosure, the method 400 may include (e.g., further include) capturing an image (e.g., a third image) of the floor surface 143 or 243 143 or 243 using the third image capture unit 130 or 230.

According to an aspect of the present disclosure, the method 400 may include (e.g., further include) stitching the captured first image, second image, and third image to form a composite image of the first channel 140, 240 or 340. For example, the first image may be cropped in a manner such that only an image of the first angular surface 141a or 241a remains (or is shown) (herein referred to as "first cropped image"). Further, the second image may be cropped in a manner such that only an image of the second angular surface 141b or 241b remains (herein referred to as "second cropped image"). Yet further, the third image may be cropped in a manner such that only an image of the floor surface 143 or 243 143 or 243 remains (herein referred to as "third cropped image"). The method 400 may include stitching the first cropped image, the second cropped image, and the third cropped image (e.g., with the third cropped image between the first and the second cropped images) form the composite image of the first channel 140, 240 or 340.

According to another aspect of the present disclosure, the method 400 may include (e.g., further include) stitching the captured first image and second image to form a composite image of the first angular surface 141a or 241a and second angular surface 141b or 241b of the first channel 140, 240 or 340.

According to an aspect of the present disclosure, the method 400 may include (e.g., further include) analysing the captured first image, second image and third image (e.g., using the processor 88) for identifying defects and/or contamination. In particular, the method 400 may include (e.g., further include) analysing the composite image of the first channel 140, 240 or 340 or the composite image of the first angular surface 141a or 241a and second angular surface 141b or 241b of the first channel 140, 240 or 340.

According to an aspect of the present disclosure, the method 400 may include (e.g., further include) operating at least the first image capture unit 110 or 210 and the second image capture unit 120 or 220 simultaneously. In particular, the first image capture unit 110 or 210 and the second image capture unit 120 or 220 of the inspection tool 100 or 200 may be configured to operate simultaneously to capture the first image of the first angular surface 141a or 241a and the second image of the second angular surface 141b or 241b at a same time.

According to an aspect of the present disclosure, the method 400 may include (e.g., further include) operating at least the first image capture unit 110 or 210, the second image capture unit 120 or 220, and the third image capture unit 130 or 230 simultaneously. In particular, the first image capture unit 110 or 210, the second image capture unit 120 or 220, and the third image capture unit 130 or 230 of the inspection tool 100 or 200 may be configured to operate simultaneously to capture the first image of the first angular surface 141a or 241a, the second image of the second angular surface 141b or 241b, and the third image of the floor surface 143 or 243 143 or 243 at a same time.

According to an aspect of the present disclosure, any one or more of the first image capture unit 110 or 210 and/or the second image capture unit 120 or 220 and/or the third image capture unit 130 or 230 may be configured to be operated (e.g., simultaneously) at regular, or irregular, time intervals in order to or for capturing a sequence or particular sequence of events (e.g., temporal-related events, for example, movement of a particle or contaminant across a width of a V-groove).

Accordingly, operating a plurality or all image capture units directed to a channel (e.g., first channel 140, 240 or 340 or secondary channel 345) of the specimen 150, 250 or 350 simultaneously, at time intervals (e.g., regular time intervals), a temporal (e.g., time-related) account (e.g., depiction or understanding) of movement, e.g., of a particle, contamination particle, or a fluid, across the said channel (e.g., first channel 140, 240 or 340 or secondary channel 345) of the specimen 150, 250 or 350 may be established.

According to an aspect of the present disclosure, the method 400 may include (e.g., further include) moving the specimen 150, 250 or 350, in the first direction (e.g., in a same direction in which the channel is extending along), with respect to at least the first image capture unit 110 or 210 and the second image capture unit 120 or 220 (and, optionally, the third image capture unit 130 or 230) of the inspection tool 100 or 200.

According to an aspect of the present disclosure, within the method 400, the specimen 150, 250 or 350 may further include the (e.g., at least one) secondary channel 345 for receiving the object (e.g., optical fiber). Accordingly, the secondary channel 345 may be positioned in and/or may be extending along the top surface 152 or 252 (e.g., top surface 152 or 252) of the specimen 150, 250 or 350 in the first direction, and the secondary channel 345 may be adjacent to the first channel 140, 240 or 340. Further, the secondary channel 345 may be defined by at least two secondary angular surfaces 346 of the specimen 150, 250 or 350, the at least two secondary angular surfaces 346 being non-parallel with the base surface 151 or 251 of the specimen 150, 250 or 350 and may be oriented with respect to the base surface 151 or 251 differently from one another.

According to an aspect of the present disclosure, the method 400 may include (e.g., further include) moving the specimen 150, 250 or 350, in a second direction substantially perpendicular to the first direction, such that the first image capture unit 110 or 210 of the inspection tool 100 or 200 may face or be directed towards the first secondary angular surface 346a of the secondary channel 345 and the second image capture unit 120 or 220 of the inspection tool 100 or 200 may face or be directed towards the second secondary angular surface 346b of the secondary channel 345. The method 400 may further include capturing an image of the first secondary angular surface 346a using the first image capture unit 110 or 210 and capturing an image of the second secondary angular surface 346b using the second image capture unit 120 or 220, for example (e.g., after moving the specimen 150, 250 or 350 in the second direction as described). The method 400 may further include capturing an image of the secondary floor surface 348 using the third image capture unit 130 or 230.

According to an aspect of the present disclosure, within the method 400, the specimen 150, 250 or 350 may be a semiconductor substrate (e.g., silicon substrate).

According to an aspect of the present disclosure, the method 400 may include (e.g., further include) placing the object in the first channel 140, 240 or 340 after capturing the first image and the second image. According to an aspect of the present disclosure, when the inspection tool 100 or 200 includes the third image capture unit 130 or 230, the method 400 may include (e.g., further include) placing the object in the first channel 140, 240 or 340 after capturing the first image, the second image, and the third image.

According to an aspect of the present disclosure, within the method 400, each of the first channel 140, 240 or 340 and/or the secondary channel 345 may be formed using an etching process on the semiconductor substrate.

According to an aspect of the present disclosure, within the method 400, each of the first angular surface 141a or 241a and the second angular surface 141b or 241b of the first channel 140, 240 or 340 may form an opposing angle with the base surface 151 or 251 of the specimen 150, 250 or 350 of between substantially 50 degrees to substantially 60 degrees. Further, each of the first secondary angular surface 346a and the second secondary angular surface 346b of the secondary channel 345 may form an opposing angle with the base surface 151 or 251 of the specimen 150, 250 or 350 of between substantially 50 degrees to substantially 60 degrees.

According to an aspect of the present disclosure, within the method 400, the first angular surface 141a or 241a and the second angular surface 141b or 241b of the first channel 140, 240 or 340 may form an angle with respect to each other of between substantially 60 degrees to substantially 80 degree. Further, the first secondary angular surface 346a and the second secondary angular surface 346b of the secondary channel 345 may form an angle with respect to each other of between substantially 60 degrees to substantially 80 degree.

According to an aspect of the present disclosure, the method 400 may include (e.g., further include) configuring each image capture unit (e.g., first image capture unit 110 or 210, second image capture unit 120 or 220, third image capture unit 130 or 230 etc.) of the inspection tool 100 or 200 to have a numerical aperture of less than 0.95.

According to an aspect of the present disclosure, the method 400 may include (e.g., further include) configuring any one or all image capture unit(s) (e.g., first image capture unit 110 or 210, second image capture unit 120 or 220, third image capture unit 130 or 230 etc.) of the inspection tool 100 or 200 with a pixel resolution of substantially 500 nm.

According to an aspect of the present disclosure, the method 400 may include (e.g., further include) configuring any one or all image capture unit(s) (e.g., first image capture unit 110 or 210, second image capture unit 120 or 220, third image capture unit 130 or 230 etc.) of the inspection tool 100 or 200 with a field of view of substantially 3.5 mm by 5 mm.

According to an aspect of the present disclosure, the method 400 may include (e.g., further include) configuring any one or all image capture unit(s) (e.g., first image capture unit 110 or 210, second image capture unit 120 or 220, third image capture unit 130 or 230 etc.) of the inspection tool 100 or 200 with a depth of field of substantially 30 μm.

Figure 5A:
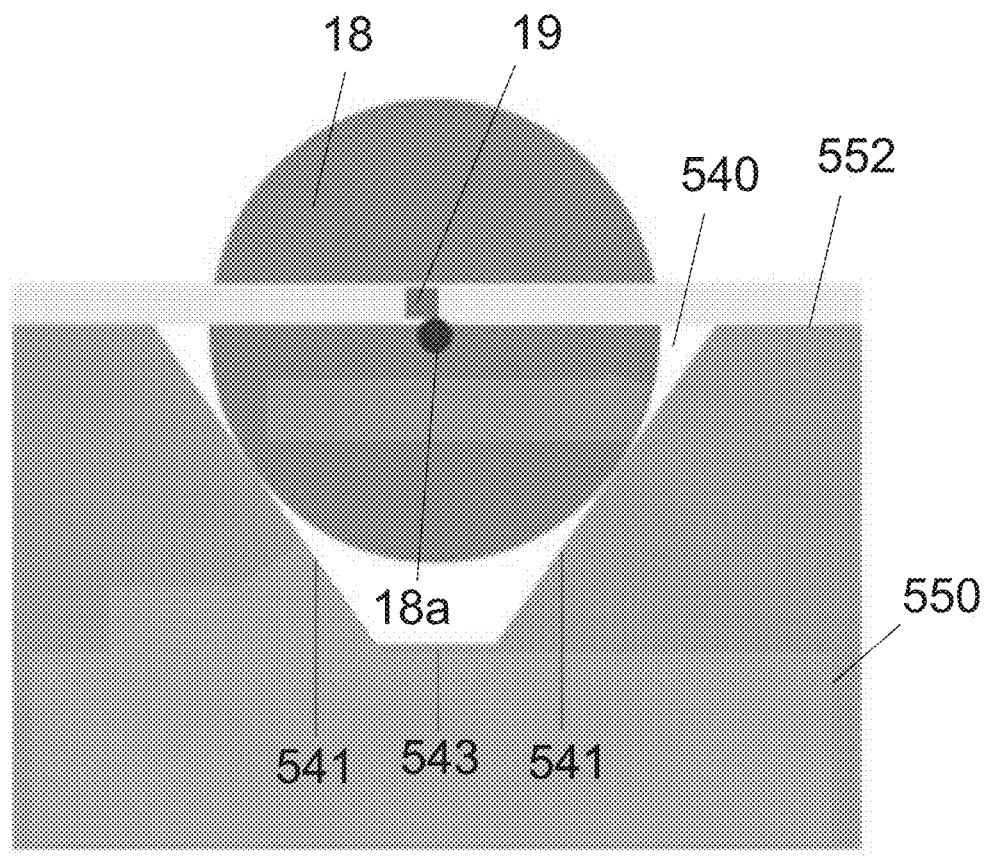
FIG. 5A shows a schematic front view of an optical fiber core, on a substantially V-shaped groove of a specimen, that is misaligned with a waveguide on a silicon PIC.

FIG. 5A shows a schematic front view of an optical fiber core 18a, on a V-groove 540 of a specimen 550, that is misaligned with a waveguide 19 on a silicon PIC.

The specimen 550 of FIG. 5A may be similar or identical to the specimen 150 of FIG. 1 or the specimen 250 of FIG. 2A or the specimen 350 of FIG. 3.

According to an aspect of the present disclosure, the specimen 550 may be a single crystal silicon wafer. At least one V-groove 540 of the specimen 550 may be anisotropically etched out in the single crystal silicon wafer, for example, using one or more photolithographically defined masks (not shown). For example, a width and position of the photolithographically mask(s) (e.g., on the single crystal silicon wafer) as well as an etch rate (e.g., control of an etch rate) may determine a shape and/or position of each formed V-groove 540. Both wet etching and dry etching may be used in such V-groove 540 formation.

As shown, the optical fiber 18 (i.e. an object) may be guided and supported by opposing sidewalls 541 (e.g., angular surfaces) of the V-groove 540. During a fiber attachment process, a buffer lid (not shown) may be used to press downwards or against the optical fiber 18 (e.g., in a direction towards a bottom 543 of the V-groove 540) from the top surface 552 of the specimen 550 to ensure contact (e.g., direct or physical contact) between the optical fiber 18 and the sidewalls 541 of the V-groove 540. A slope of the sidewalls 541 (e.g., angular surfaces) of the V-groove 540 which may be, for example, about 55 degrees from a horizontal (e.g., 54.74 degrees), may be defined by silicon crystal structure orientation since etching rates in different crystal orientations may be different. Non-ideal shape, location and orientation of the V-groove 540 may lead to misalignment between the optical fiber 18 and the waveguide 19 (as shown in FIG. 5A, e.g., optical fiber core 18a is not aligned with waveguide 19) in or on the PIC (e.g., silicon PIC), which may result in lower optical coupling efficiency. Any contamination larger than 1 μm on the sidewalls 541 of the V-groove 540 may be another cause for misalignment between the optical fiber 18 and the waveguide 19 since any such contamination (e.g., particle, contaminant etc.) may misposition or misplace or misalign the optical fiber 18 (e.g., with respect to the waveguide 19) (as shown in FIG. 5A). Therefore, it may be crucial or important to ensure cleanliness of the V-groove 540 and the optical fiber 18.

Figure 5B:
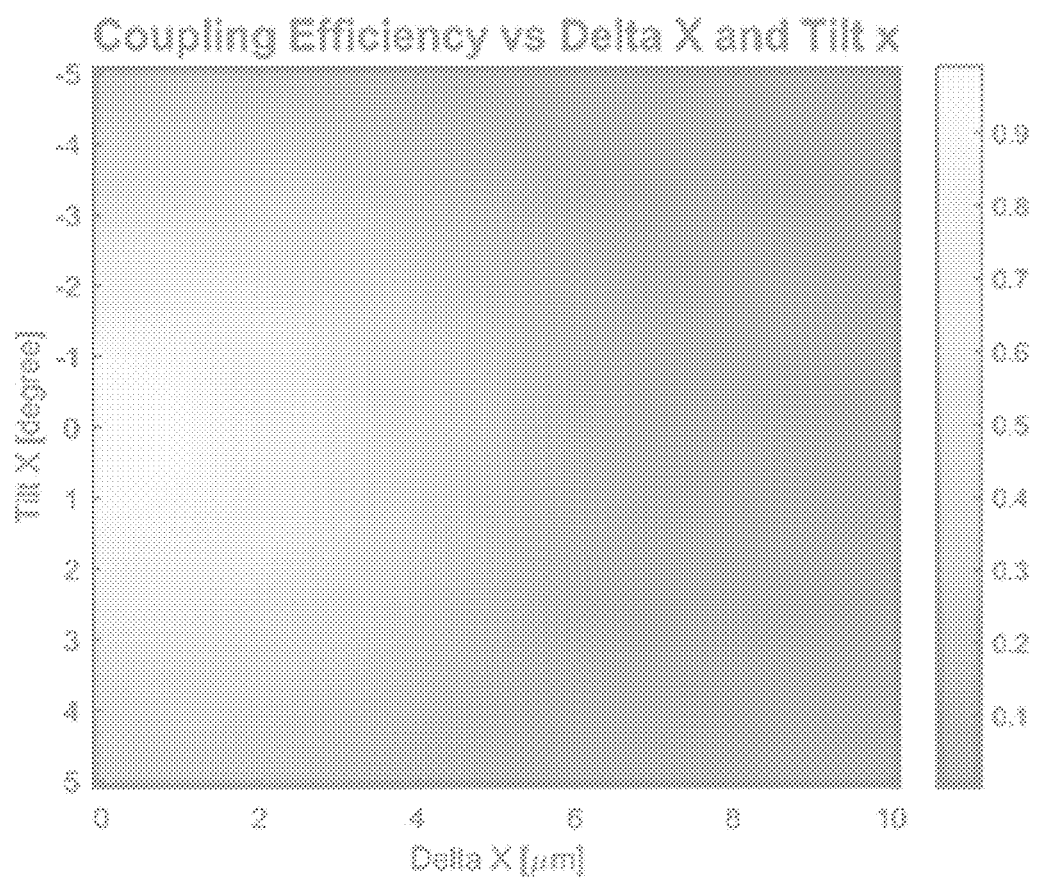
FIG. 5B is a graph depicting an optical coupling efficiency's dependence on lateral translation misalignment and angular mismatch.

FIG. 5B is a graph depicting an optical coupling efficiency's dependence on lateral translation misalignment and angular mismatch.

FIG. 5B may be used to understand a misalignment tolerance between the optical fiber 18 and the waveguide 19 in or on the PIC, with respect to lateral translation and angular degrees of freedom. With reference to FIG. 5B, a 2 μm of lateral translation misalignment and/or 2 degrees of angular misalignment may lead to about 20% light loss. In aspects involving a photonic integrated device, no more than 20% light loss may be afforded for one single optical interface. Therefore, good alignment both in translation and angular degrees of freedom may be essential.

Figure 6A:
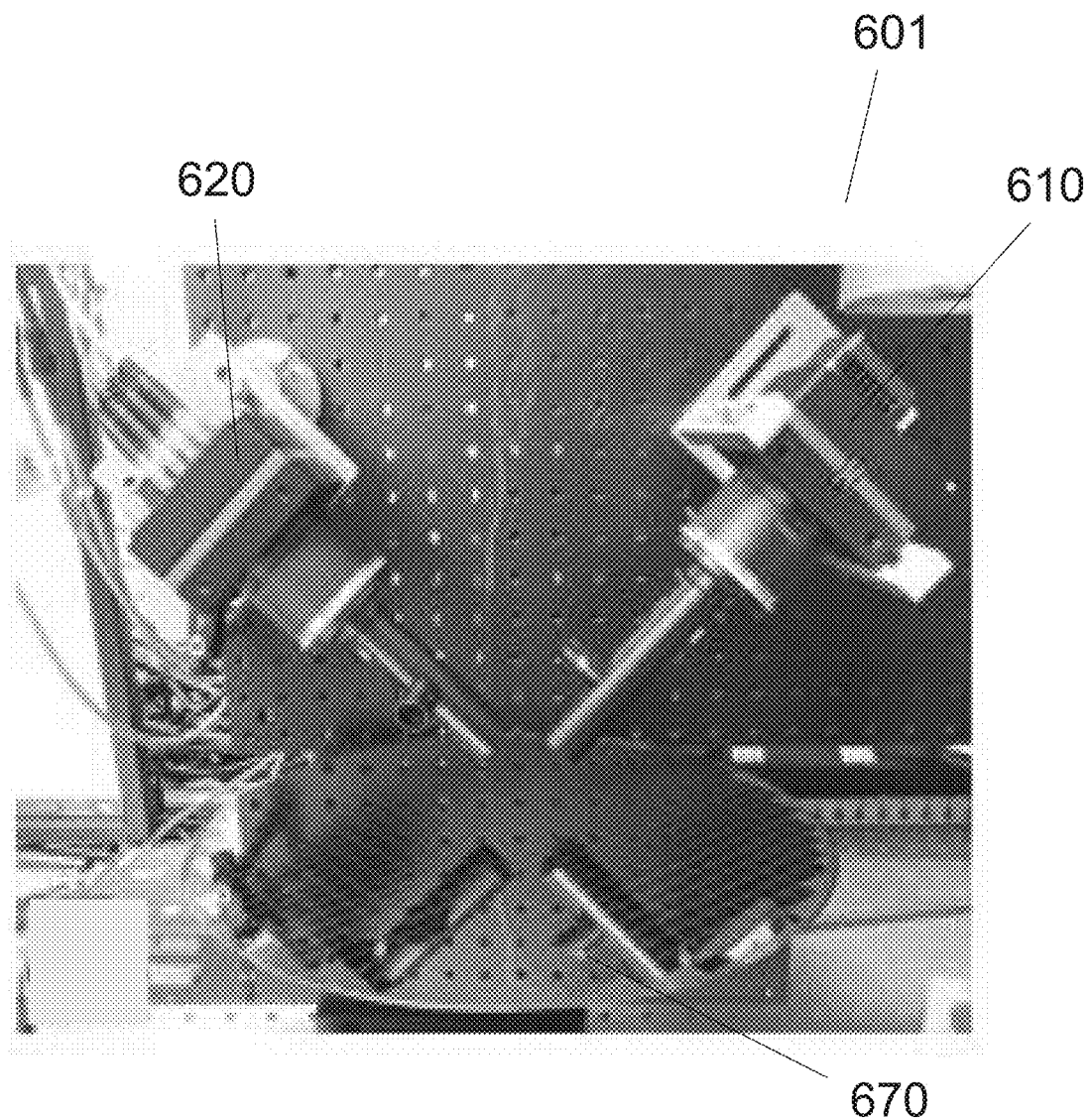
FIG. 6A and FIG. 6B are photographs of prototype inspection tools, according to various aspects of the present disclosure.
Figure 6B:
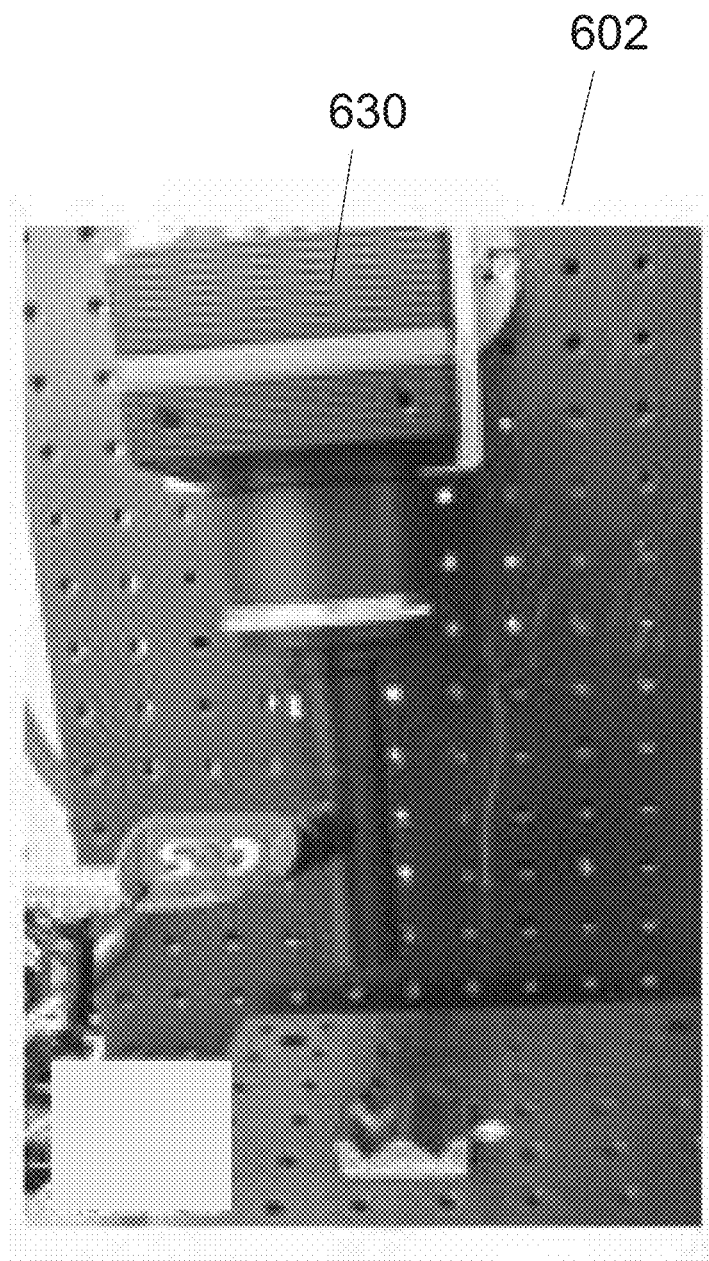

FIG. 6A and FIG. 6B are photographs of prototype inspection tools 601 and 602, according to various aspects of the present disclosure.

In an aspect, the inspection tools 601 and 602 of FIG. 6A and FIG. 6B may be prototypes (e.g., full or partial prototypes) of the inspection tool 100 of FIG. 1 or the inspection tool 200 of FIG. 2A and FIG. 3. In an aspect, the prototype inspection tools 601 and 602 may be configured to inspect the specimen 550 of FIG. 5A.

The prototype inspection tools 601 and 602 may be referred to as an "all-surface V-groove 2D inspection system" and may be capable of detecting any defects and/or any contaminants or particles (e.g., submicron-sized contaminations or particles) on the V-groove 540 of the specimen 550.

As shown, the prototype inspection tool 601 may include two sidewall orientated vision systems 610 and 620 (i.e. first image capture unit 610 and second image capture unit 620), which may be similar or identical to the first image capture unit 110 or 210 and the second image capture unit 120 or 220 of the inspection tool 100 of FIG. 1 or the inspection tool 200 of FIG. 2A and FIG. 3. Accordingly, the two sidewall orientated vision systems 610 and 620 may be oriented to be directed to the opposing sidewalls 541 (e.g., angular surfaces) of the V-groove 540 of the specimen 550 (e.g., when the specimen 550 is placed on a platform 670). As an example, in an aspect, each of the two sidewall orientated vision systems 610 and 620 may be or may include a 2-dimensional camera.

In an aspect, the prototype inspection tool 602 may include one top-down vision system 630 (i.e. a third image capture unit 630), which may be similar or identical to the third image capture unit 130 or 230 of the inspection tool 100 of FIG. 1 or the inspection tool 200 of FIG. 2A and FIG. 3. Accordingly, the top-down vision system 630 may be oriented to be directed to a plateau 543 (e.g., horizontal inner surface or floor surface) of the V-groove 540 of the specimen 550 between the opposing sidewalls 541 (e.g., angular surfaces) of the V-groove 540 and/or directed to a top surface 552 of the specimen 550. As an example, in an aspect, the top-down vision system 630 may be or may include a 2-dimensional camera.

Figure 7A:
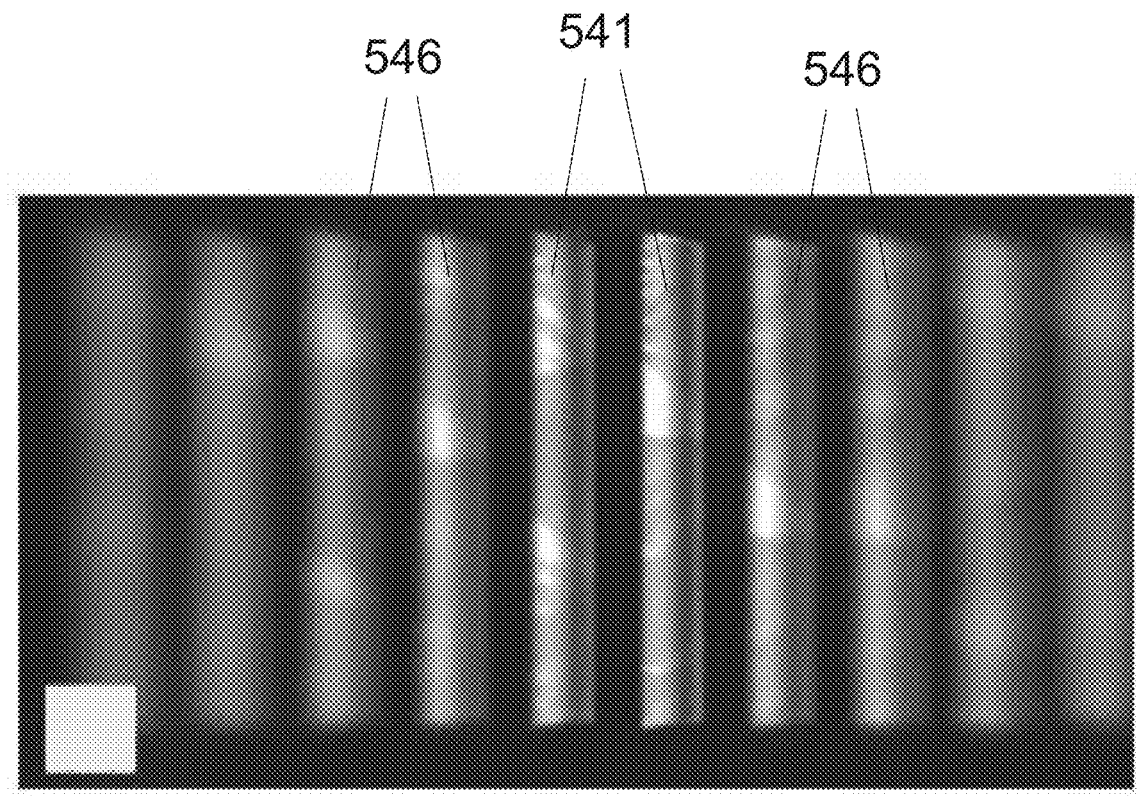
FIG. 7A show an image captured using a first image capture unit and a second image capture unit of the prototype inspection tool of FIG. 6A, according to various aspects of the present disclosure.

FIG. 7A show an image captured using the first image capture unit 610 and the second image capture unit 620 of the prototype inspection tool 601, according to various aspects of the present disclosure.

With reference to FIG. 7A, the sidewall orientated vision systems 610 and 620 (i.e. image capture units) may be focused on (e.g., only on) the opposing sidewalls 541 (e.g., angular surfaces) of the V-groove 540 (e.g., one vision system/image capture unit to one sidewall) such that the sidewall orientated vision systems 610 and 620 may be capable of capturing a focused or sharp image of the opposing sidewalls 541 but not of the plateau 543 (e.g., horizontal inner surface) and/or the top surface 552 of the specimen 550.

Figure 7B:
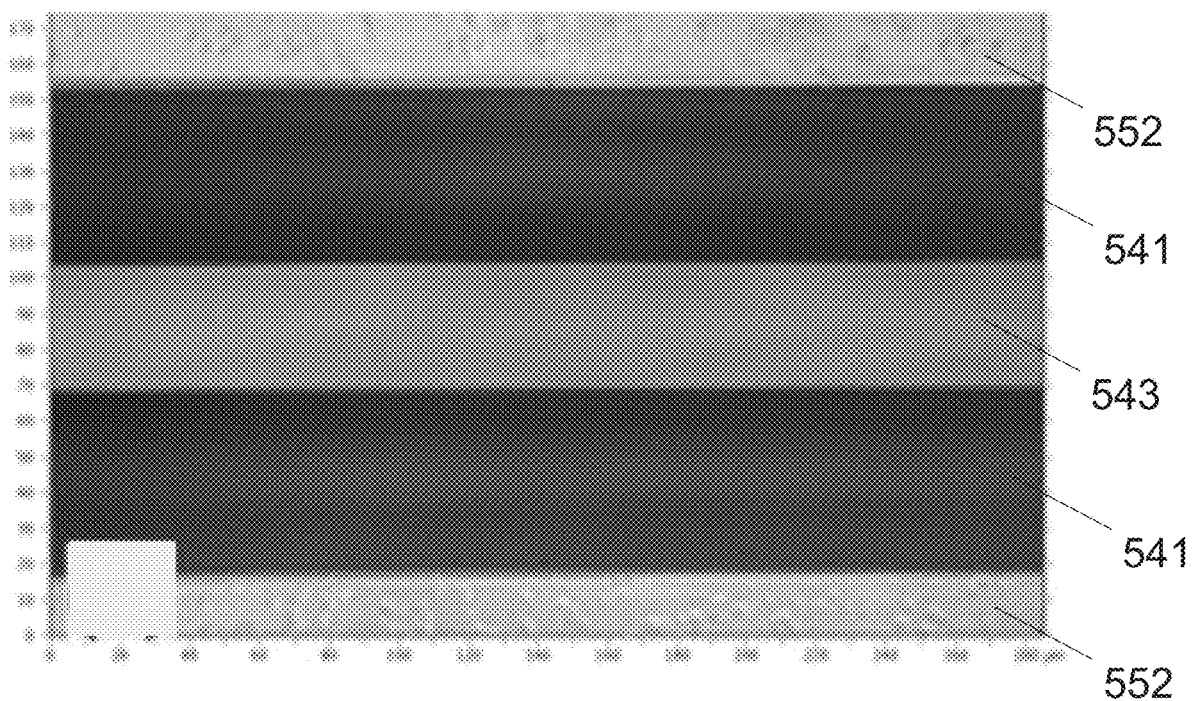
FIG. 7B show an image captured using a third image capture unit of the prototype inspection tool of FIG. 6B, according to various aspects of the present disclosure.

FIG. 7B show an image captured using the third image capture unit 630 of the prototype inspection tool 602, according to various aspects of the present disclosure.

With reference to FIG. 7B, the top-down vision system 630 may be focused on (e.g., only on) the plateau 543 (e.g., horizontal inner surface) and/or the top surface 552 of the specimen 550 such that the top-down vision system 630 may be capable of capturing a focused or sharp image of the plateau 543 (e.g., horizontal inner surface) and/or the top surface 552 of the specimen 550 but not of the opposing sidewalls 541.

Figure 7C:
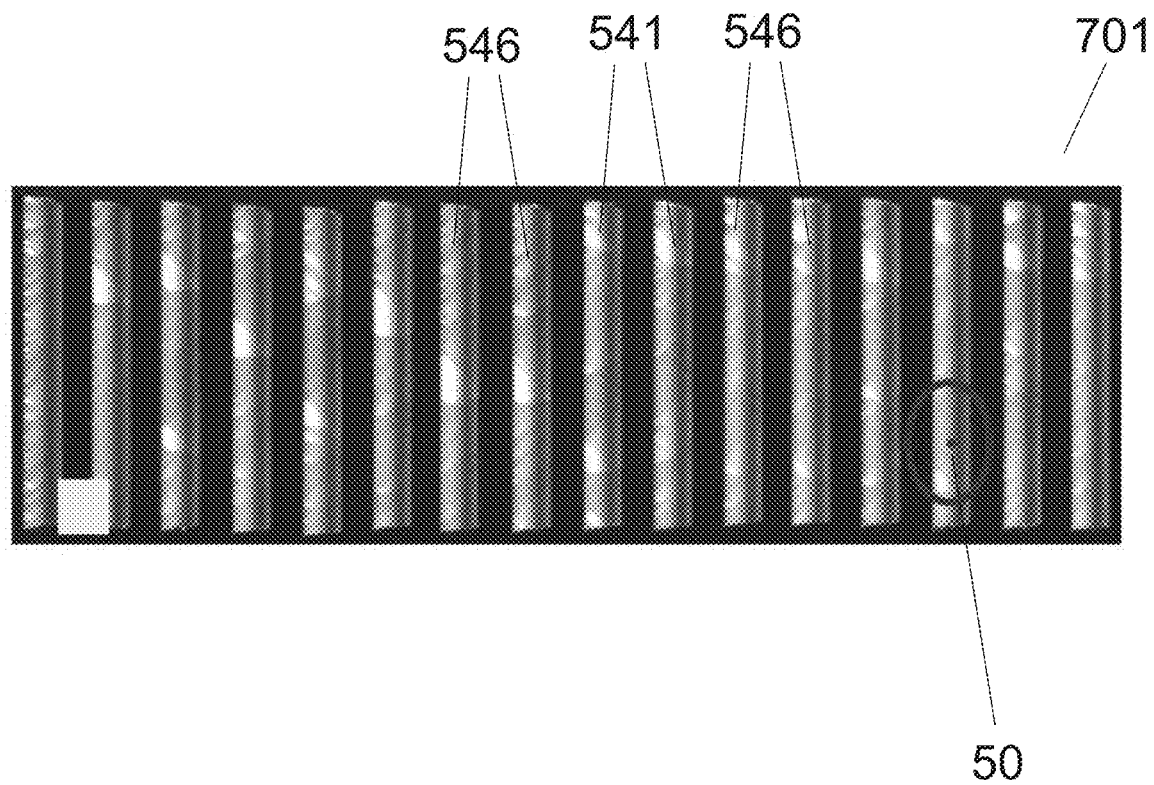
FIG. 7C show a composite image formed by stitching the images captured using the first image capture unit, the second image capture unit, and the third image capture unit of the prototype inspection tool of FIG. 6A and FIG. 6B, according to various aspects of the present disclosure.

FIG. 7C show a composite image 701 formed by stitching the images captured using the first image capture unit 610, the second image capture unit 620, and the third image capture unit 630 of the prototype inspection tools 601 and 602, according to various aspects of the present disclosure.

The images captured by the three imaging systems (i.e. the sidewall orientated vision systems 610 and 620 and the top-down vision system 630) of the prototype inspection tools 601 and 602 may (e.g., optionally) be stitched together to form a composite image 701 for better visualization of the V-groove(s) (e.g., of a first channel or a secondary channel) of the specimen 550 (e.g., for contamination detection purposes).

Specifically, referring back to FIG. 7B, the image shown is taken by the top-down vision system 630 configured with a numerical aperture of 0.95 so as to be capable of capturing a focused or sharp image of the plateau 543 (e.g., horizontal inner surface) and/or the top surface 552 of the specimen 550 but not of the opposing sidewalls 541 of a channel. In the image shown in FIG. 7B, the opposing sidewalls 541 appear darker (e.g., in color and/or contrast) as compared to the plateau 543 (e.g., horizontal inner surface) and/or the top surface 552 of the specimen 550 due to the opposing sidewalls 541 being inclined (e.g., being a steep slope) with respect to an optical axis of the top-down vision system 630, thereby leading to much lower light collection efficiency by the top-down vision system 630 of these inclined opposing sidewalls 541.

On the other hand, FIG. 7A shows an image taken by the sidewall orientated vision systems 610 and 620 configured with a much lower numerical aperture than the top-down vision system 630, such that the sidewall orientated vision systems 610 and 620 may be capable of capturing a focused or sharp image of the opposing sidewalls 541 of a channel, but not of the plateau 543 (e.g., horizontal inner surface) and/or the top surface 552 of the specimen 550, since only each sidewall 541 may be perpendicular (e.g., substantially perpendicular) to an optical axis of a corresponding (e.g., one) vision system (e.g., image capture unit) of the sidewall orientated vision systems 610 and 620 but may be inclined or non-perpendicular with respect to the optical axis of the top-down vision system 630. In an aspect, a depth of field of each vision system (e.g., image capture unit) of the sidewall orientated vision systems 610 and 620 may be configured in a manner such that a pair (e.g., only a pair) of opposing sidewalls 541 (e.g., of a first channel) may appear in focus while other sidewalls 546 (e.g., of one or more secondary channels which may be spaced apart from the first channel by about 200 µm) may be out of focus.

The in-focus sidewall images, e.g., captured by the sidewall orientated vision systems 610 and 620, of each channel may be cropped and stitched together as shown in FIG. 7C. In FIG. 7C, a foreign material 50 (e.g., contaminant) of about 15 µm in diameter is circled. In addition, from the sidewall images shown in FIG. 7C, it may be readily observed that etched surface(s) 541 and/or 546 of the V-groove 540 of the specimen 550 may not be completely smooth, which may be validated to be around 500 nm by utilizing 3D profilers (not shown).

Figure 8:
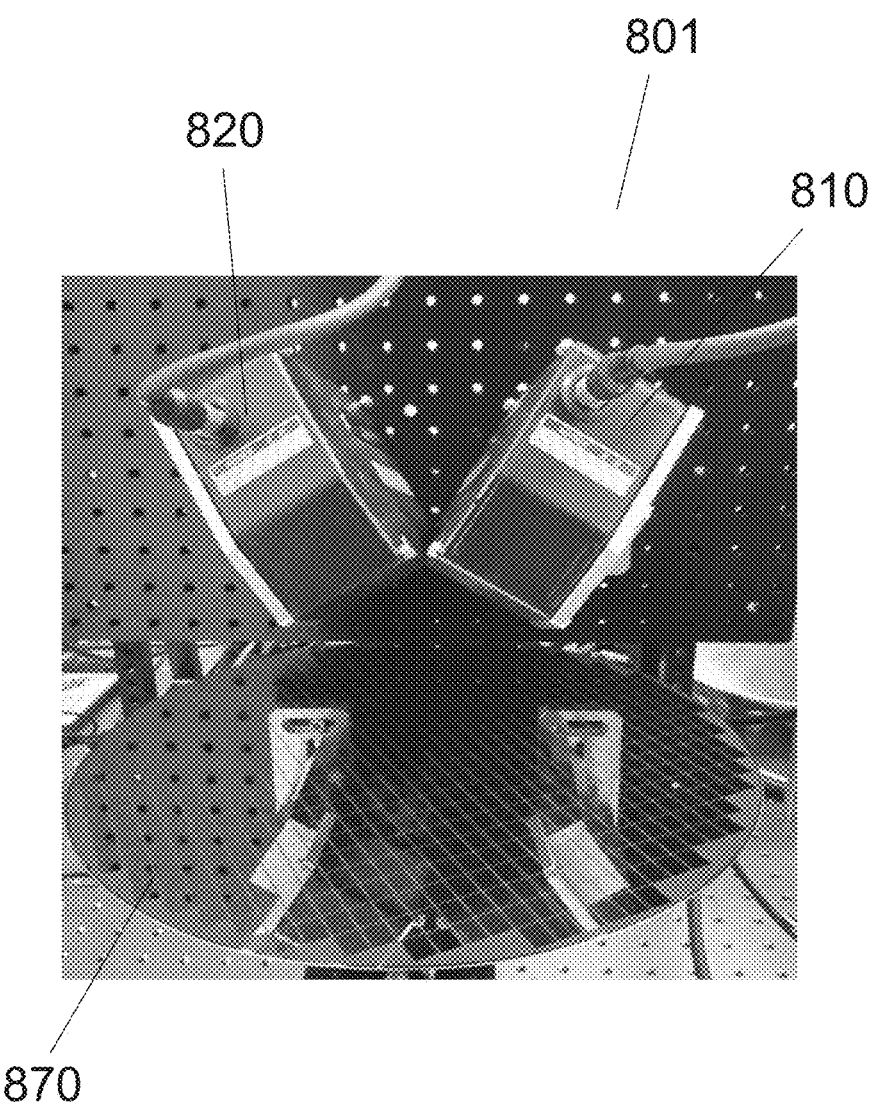
FIG. 8 is a photograph of another prototype inspection tool, according to various aspects of the present disclosure.

FIG. 8 is a photograph of another prototype inspection tool 801, according to various aspects of the present disclosure.

In an aspect, the inspection tool 801 of FIG. 8 may be another prototype (e.g., full or partial prototype) of the inspection tool 100 of FIG. 1 or the inspection tool 200 of FIG. 2A and FIG. 3. In an aspect, the prototype inspection tool 801 may be configured to inspect the specimen 550 of FIG. 5A.

As shown, the prototype inspection tool 801 may include two triangulation sensors (e.g., two 3-dimensional profilers) (i.e. first image capture unit 810 and second image capture unit 820), which may be similar or identical to the first image capture unit 110 or 210 and the second image capture unit 120 or 220 of the inspection tool 100 of FIG. 1 or the inspection tool 200 of FIG. 2A and FIG. 3. Accordingly, the two triangulation sensors 810 and 820 (i.e. two image capture units) may be oriented to be directed to the opposing sidewalls 541 (e.g., two substantially opposing angular surfaces) of the V-groove 540 of the specimen 550 (e.g., when the specimen 550 is placed on a platform 870).

With the prototype inspection tools 601 and 602 of FIG. 6A and FIG. 6B, which may (as an example) use or include 2-dimensional cameras (i.e. 2-dimensional image capture units) for 2-dimensional inspection of a specimen, spatial relation between the various or multiple 2-dimensional cameras (i.e. 2-dimensional image capture units) may not be required or determined (e.g., for an inspection of a specimen). On the other hand, with the prototype inspection tool 801 of FIG. 8, which may (as an example) use or include 3-dimensional profilers (i.e. 3-dimensional image capture units), spatial relations of or between the 3-dimensional profilers (i.e. image capture units) may be required to be determined or well-defined (e.g., for an inspection of a specimen). Hence, according to various aspects of the present disclosure, use of 3-dimensional profilers (i.e. 3-dimensional image capture units) may involve calibration (e.g., before an inspection of a specimen) to register relative position(s) and/or direction(s) and/or orientation(s) (e.g., with sub-micrometer precision or tolerances) of such 3-dimensional profilers of an inspection tool according to various aspects of the present disclosure. Accordingly, based on the calibrated relative position and/or direction and/or orientation of each 3-dimensional profiler of an inspection tool, according to various aspects of the present disclosure, with respect to each other (e.g., each or all remaining) 3-dimensional profiler(s) of the inspection tool (e.g., prototype inspection tool 801), a 3-dimensional profile (e.g. line profile) of a surface (e.g., of a V-groove) of a specimen may be produced or obtained via the 3-dimensional profilers of the inspection tool (e.g., by stitching or synthesizing the captured images by the 3-dimensional profilers of the inspection tool together based on data of the relative position and/or direction and/or orientation of each 3-dimensional profiler with respect to each other 3-dimensional profiler of the inspection tool used for inspection of the specimen).

Figure 9:
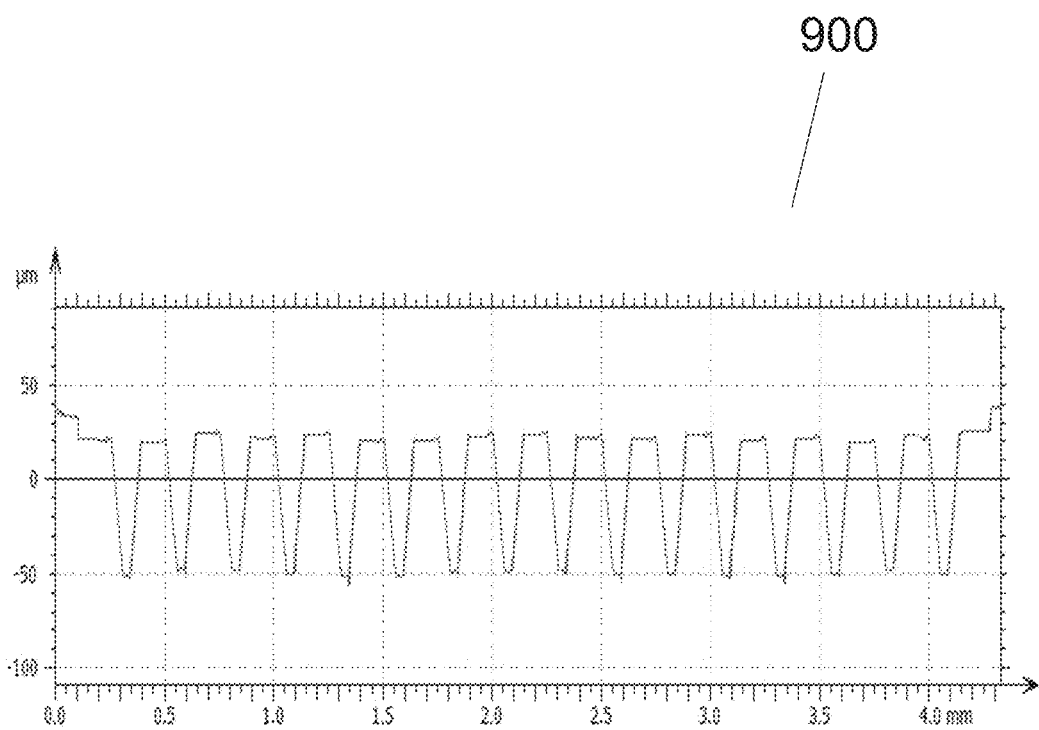
FIG. 9 is a graph, depicting a line profile of substantially V-shaped grooves of a specimen, obtained using at least two laser confocal 3-dimensional profiler of an inspection too.

FIG. 9 is a graph 900, depicting a line profile of V-grooves of a specimen (not shown), obtained using at least two laser confocal 3-dimensional profiler (i.e. image capture units) of an inspection tool (not shown).

Figure 10:
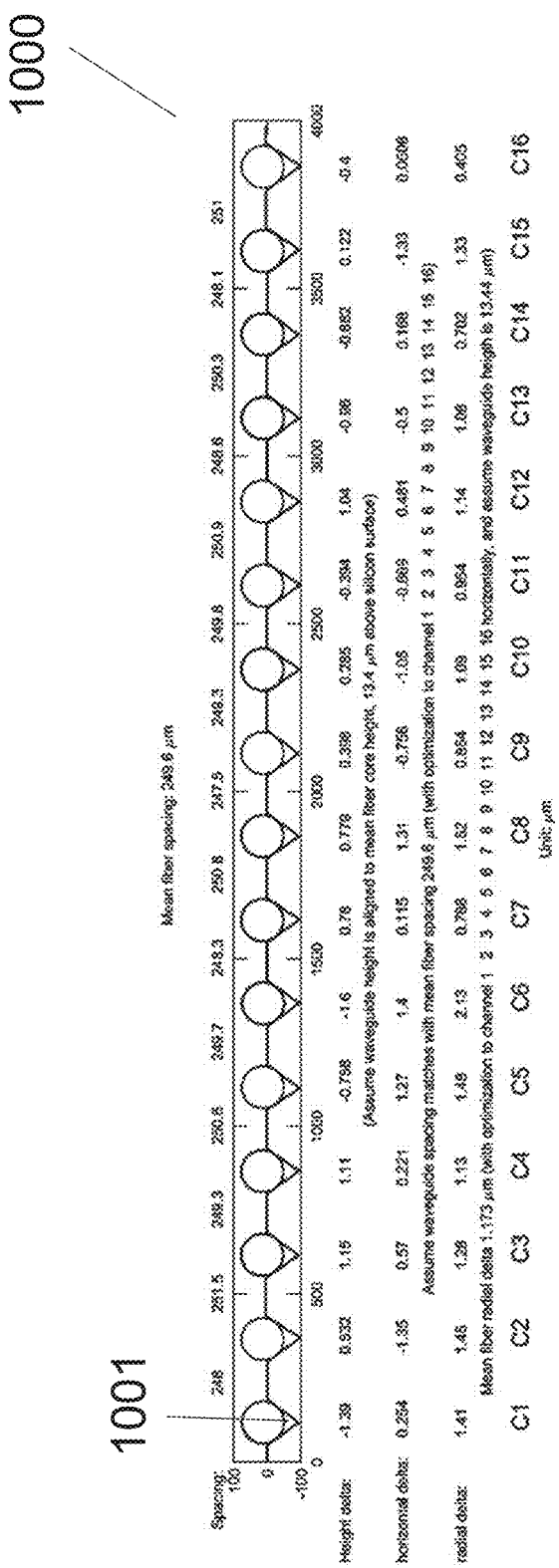
FIG. 10 a table depicting a magnitude of any optical fiber core misalignment with respect to a waveguide in a PIC based on the graph of FIG. 9A.

FIG. 10 is a table 1000 depicting a magnitude of any optical fiber core misalignment with respect to a waveguide in a PIC (not shown) based on an inspection method using 3-dimensional profilers (i.e. image capture units) of an inspection tool (not shown).

For example, with reference to FIG. 10, if an optical fiber (e.g., for a semiconductor application) is placed on or in a first V-groove 1001 of a specimen (not shown), it may be observed from the table 1000 that the optical fiber may be vertically misaligned from the waveguide in PIC by 1.39 μm, horizontally misaligned from the waveguide in PIC by 0.25 μm, and radially misaligned from the waveguide in PIC by 1.41 μm.

To more readily understand and put into practical effect the present metrology system and methods for their use in gap measurements, they will now be described by way of examples. For the sake of brevity, duplicate descriptions of features and properties may be omitted.

EXAMPLES

Example 1 provides an inspection method which may include providing a specimen for inspection, the specimen may include a base surface, a top surface opposite the base surface, a first channel positioned in the top surface in a first direction for receiving an object therein. The first channel may be formed by at least two angular surfaces of the specimen, the at least two angular surfaces declining from the top surface of the specimen. The inspection method may further include providing an inspection tool to inspect the specimen, the inspection tool may include (i) a first image capture unit oriented to face a first angular surface of the at least two angular surfaces and (ii) a second image capture unit oriented to face a second angular surface of the at least two angular surfaces. The inspection method may further include capturing a first image of the first angular surface using the first image capture unit and capturing a second image of the second angular surface using the second image capture unit, for inspection of the specimen.

Example 2 may include the method of example 1 and/or any other example disclosed herein, for which an optical axis of the first image capture unit may be substantially perpendicular to the first angular surface and an optical axis of the second image capture unit may be substantially perpendicular to the second angular surface.

Example 3 may include the method of example 1 and/or any other example disclosed herein, for which the first channel further may include a floor surface that is substantially parallel with the base surface of the specimen, for which the floor surface may be adjoined to and may be positioned between the first angular surface and the second angular surface. Further, in Example 3, the inspection tool may further include a third image capture unit oriented to face the floor surface, and the method may include capturing a third image of the floor surface using the third image capture unit.

Example 4 may include the method of example 3 and/or any other example disclosed herein, for which the method may further include stitching the captured first image, second image and third image together to form a composite image of the first channel, and analysing the captured first image, second image and third image using a processor for identifying defects or contamination along the first channel.

Example 5 may include the method of example 1 and/or any other example disclosed herein, for which the first image capture unit and the second image capture unit of the inspection tool may be configured to operate simultaneously to capture the first image of the first angular surface and the second image of the second angular surface at a same time.

Example 6 may include the method of example 1 and/or any other example disclosed herein, for which the method may further include moving the specimen, in the first direction, with respect to the first image capture unit and the second image capture unit of the inspection tool.

Example 7 may include the method of example 1 and/or any other example disclosed herein, for which the specimen may further include a secondary channel, positioned in the top surface of the specimen and in the first direction, for receiving the object therein. Further, in Example 7, the secondary channel may be formed by at least two secondary angular surfaces of the specimen, the at least two secondary angular surfaces declining from the top surface of the specimen. Further, in Example 7, the secondary channel may be adjacent to the first channel.

Example 8 may include the method of example 7 and/or any other example disclosed herein, for which the method may further include moving the specimen, in a second direction substantially perpendicular to the first direction, such that the first image capture unit of the inspection tool faces a first secondary angular surface of the secondary channel and the second image capture unit of the inspection tool faces a second secondary angular surface of the secondary channel, and thereafter, capturing an image of the first secondary angular surface using the first image capture unit and capturing an image of the second secondary angular surface using the second image capture unit.

Example 9 may include the method of example 1 and/or any other example disclosed herein, for which the specimen is a semiconductor substrate and the object is an optical fiber.

Example 10 may include the method of example 1 and/or any other example disclosed herein, for which the method may further include placing the object in the first channel after capturing the first image and the second image.

Example 11 may include the method of example 1 and/or any other example disclosed herein, for which the first angular surface and the second angular surface of the first channel may respectively form an opposing angle with the base surface of the specimen of between substantially 50 degrees to substantially 60 degrees.

Example 12 may include the method of example 1 and/or any other example disclosed herein, for which the first angular surface and the second angular surface of the first channel may form an angle with respect to each other of between substantially 60 degrees to substantially 80 degree.

Example 13 may include the method of example 1 and/or any other example disclosed herein, for which the method may further include configuring each image capture unit of the inspection tool to have a numerical aperture of less than 0.95.

Example 14 may include the method of example 1 and/or any other example disclosed herein, for which the method may further include configuring each image capture unit of the inspection tool with a pixel resolution of substantially 500 nm, a field of view of substantially 3.5 mm by 5 mm, and a depth of field of substantially 30 µm.

Example 15 may include the method of example 1 and/or any other example disclosed herein, for which an opening on the top surface of the specimen for providing access to the first channel has a lateral width of not more than 200 µm.

Example 16 provides an inspection method which may include providing a specimen for inspection, the specimen including a base surface, a top surface opposite the base surface, a substantially V-shaped groove formed in the top surface of the specimen, for receiving an optical fiber therein, the groove being defined by a floor surface that is substantially parallel with the base surface of the specimen and two angular surfaces extending from the floor surface towards an opening of the groove at the top surface, for which the two angular surfaces are declining from the top surface of the specimen, and each of the two angular surfaces forms an angle of between 50 degrees to 60 degrees with respect to the base surface. Further, Example 16 may include providing an inspection tool comprising (i) a first image capture unit configured to face a first of the two angular surfaces and (ii) a second image capture unit configured to face a second of the two angular surfaces, and capturing an image of the first angular surface using the first image capture unit and capturing an image of the second angular surface using the second image capture unit.

Example 17 may include the method of example 16 and/or any other example disclosed herein, for which an optical axis of the first image capture unit of the inspection tool may be substantially perpendicular to the first of the two angular surfaces and an optical axis of the second image capture unit of the inspection tool may be substantially perpendicular to the second of the two angular surfaces.

Example 18 may include the method of example 16 and/or any other example disclosed herein, for which the first image capture unit and the second image capture unit may be configured identically, with a respective numerical aperture of less than 0.95, a respective pixel resolution of substantially 500 nm, a respective field of view of substantially 3.5 mm by 5 mm, and a respective depth of field of substantially 30 µm.

Example 19 may provide an optical inspection tool which may include at least a first image capture unit and a second image capture unit for inspecting specimens having one or more substantially V-shaped grooves, for which the first image capture unit arranged in a first orientation may be directable towards a first angular surface of a first V-shaped groove of a first specimen, and for which the second image capture unit arranged in a second orientation may be directable towards a second angular surface of the first V-shaped groove of the first specimen. Further, the first image capture unit may be configured to capture images of defects or contamination on the first angular surface and the second image capture unit may be configured to capture images of defects or contamination on the second angular surface.

Example 20 may include the optical inspection tool of example 19 and/or any other example disclosed herein, for which the optical inspection tool may further include a third image capture unit arranged in a third orientation being directable towards a bottom surface of the groove positioned between and adjoining the first angular surface and the second angular surface of the V-shaped groove, for which the third image capture unit may be configured to capture images of defects or contamination on the bottom surface. The optical inspection tool may further include a processor coupled to the first image capture unit, the second image capture unit, and the third image capture unit to analyse the captured images by the first image capture unit, the second image capture unit, and the third image capture unit.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. An inspection method comprising:
providing a specimen for inspection, the specimen comprising a base surface, a top surface opposite the base surface, a first channel positioned in the top surface in a first direction for receiving an object therein, wherein the first channel is formed by at least two angular surfaces of the specimen, the at least two angular surfaces declining from the top surface of the specimen;
providing an inspection tool to inspect the specimen, the inspection tool comprising (i) a first image capture unit oriented to face a first angular surface of the at least two angular surfaces and (ii) a second image capture unit oriented to face a second angular surface of the at least two angular surfaces;
capturing a first image of the first angular surface using the first image capture unit and capturing a second image of the second angular surface using the second image capture unit, for inspection of the specimen.

2. The method of claim 1,
wherein an optical axis of the first image capture unit is substantially perpendicular to the first angular surface; and
wherein an optical axis of the second image capture unit is substantially perpendicular to the second angular surface.

3. The method of claim 1,
wherein the first channel further comprises a floor surface that is substantially parallel with the base surface of the specimen, wherein the floor surface is adjoined to and is positioned between the first angular surface and the second angular surface;
wherein the inspection tool further comprises a third image capture unit oriented to face the floor surface; and
capturing a third image of the floor surface using the third image capture unit.

4. The method of claim 3 further comprising:
stitching the captured first image, second image and third image together to form a composite image of the first channel; and
analysing the captured first image, second image and third image using a processor for identifying defects or contamination along the first channel.

5. The method of claim 1,
wherein the first image capture unit and the second image capture unit of the inspection tool are configured to operate simultaneously to capture the first image of the first angular surface and the second image of the second angular surface at a same time.

6. The method of claim 1 further comprising:
moving the specimen, in the first direction, with respect to the first image capture unit and the second image capture unit of the inspection tool.

7. The method of claim 1,
wherein the specimen further comprises a secondary channel, positioned in the top surface of the specimen and in the first direction, for receiving the object therein;
wherein the secondary channel is formed by at least two secondary angular surfaces of the specimen, the at least two secondary angular surfaces declining from the top surface of the specimen;
wherein the secondary channel is adjacent to the first channel.

8. The method of claim 7 further comprising:
moving the specimen, in a second direction substantially perpendicular to the first direction, such that the first image capture unit of the inspection tool faces a first secondary angular surface of the secondary channel and the second image capture unit of the inspection tool faces a second secondary angular surface of the secondary channel, and thereafter,
capturing an image of the first secondary angular surface using the first image capture unit and capturing an image of the second secondary angular surface using the second image capture unit.

9. The method of claim 1,
wherein the specimen is a semiconductor substrate; and
wherein the object is an optical fiber.

10. The method of claim 1 further comprising:
placing the object in the first channel after capturing the first image and the second image.

11. The method of claim 1,
wherein each of the first angular surface and the second angular surface of the first channel forms an opposing angle with the base surface of the specimen of between substantially 50 degrees to substantially 60 degrees.

12. The method of claim 1,
wherein the first angular surface and the second angular surface of the first channel form an angle with respect to each other of between substantially 60 degrees to substantially 80 degree.

13. The method of claim 1,
configuring each image capture unit of the inspection tool to have a numerical aperture of less than 0.95.

14. The method of claim 1,
configuring each image capture unit of the inspection tool with a pixel resolution of substantially 500 nm, a field of view of substantially 3.5 mm by 5 mm, and a depth of field of substantially 30 µm.

15. The method of claim 1,
wherein an opening on the top surface of the specimen for providing access to the first channel has a lateral width of not more than 200 µm.

16. An inspection method comprising:
providing a specimen for inspection, the specimen comprising a base surface, a top surface opposite the base surface, a substantially V-shaped groove formed in the top surface of the specimen, for receiving an optical fiber therein, the groove being defined by a floor surface that is substantially parallel with the base surface of the specimen and two angular surfaces extending from the floor surface towards an opening of the groove at the top surface, wherein the two angular surfaces are declining from the top surface of the specimen, and each of the two angular surfaces forms an angle of between 50 degrees to 60 degrees with respect to the base surface;
providing an inspection tool comprising (i) a first image capture unit configured to face a first of the two angular surfaces and (ii) a second image capture unit configured to face a second of the two angular surfaces; and
capturing an image of the first angular surface using the first image capture unit and capturing an image of the second angular surface using the second image capture unit.

17. The method of claim 16,
wherein an optical axis of the first image capture unit of the inspection tool is substantially perpendicular to the first of the two angular surfaces; and
wherein an optical axis of the second image capture unit of the inspection tool is substantially perpendicular to the second of the two angular surfaces.

18. The method of claim 16,
wherein the first image capture unit and the second image capture unit are configured identically, with a respective numerical aperture of less than 0.95, a respective pixel resolution of substantially 500 nm, a respective field of view of substantially 3.5 mm by 5 mm, and a respective depth of field of substantially 30 µm.

19. An optical inspection tool comprising:
at least a first image capture unit and a second image capture unit for inspecting specimens having one or more substantially V-shaped grooves;
wherein the first image capture unit is arranged in a first orientation directed towards a first angular surface of a first V-shaped groove of a first specimen, and wherein the second image capture unit is arranged in a second orientation directed towards a second angular surface of the first V-shaped groove of the first specimen;
wherein the first image capture unit is configured to capture images of defects or contamination on the first angular surface and the second image capture unit is configured to capture images of defects or contamination on the second angular surface.

20. The optical inspection tool of claim 19, further comprising:
a third image capture unit arranged in a third orientation is directable towards a bottom surface of the groove positioned between and adjoining the first angular surface and the second angular surface of the V-shaped groove;
wherein the third image capture unit is configured to capture images of defects or contamination on the bottom surface; and
a processor coupled to the first image capture unit, the second image capture unit, and the third image capture unit to analyse the captured images by the first image capture unit, the second image capture unit, and the third image capture unit.

* * * * *